(12) United States Patent
Owen et al.

(10) Patent No.: US 7,904,073 B2
(45) Date of Patent: Mar. 8, 2011

(54) SYSTEM AND METHOD FOR PROCESSING EXTENSIBLE MARKUP LANGUAGE (XML) DOCUMENTS

(75) Inventors: Russell N. Owen, Waterloo (CA); Bill Yuan, Burlington (CA); Andrei A. Lifchits, Wyevale (CA); Michael Knowles, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/615,608

(22) Filed: Nov. 10, 2009

(65) Prior Publication Data

US 2010/0050072 A1 Feb. 25, 2010

Related U.S. Application Data

(62) Division of application No. 10/849,833, filed on May 21, 2004, now Pat. No. 7,636,565.

(51) Int. Cl.
*H04M 3/00* (2006.01)

(52) U.S. Cl. .................. 455/419; 455/412.1; 455/414.1; 455/418

(58) Field of Classification Search ............... 455/412.1, 455/414.1–4, 418–420, 432.3; 709/218, 709/219, 246, 247
See application file for complete search history.

(56) References Cited

U.S. PATENT DOCUMENTS

| | | | |
|---|---|---|---|
| 5,544,320 A | 8/1996 | Konrad | |
| 5,706,434 A | 1/1998 | Kremen et al. | |
| 5,724,556 A | 3/1998 | Souder et al. | |
| 5,768,510 A | 6/1998 | Gish | |
| 5,987,181 A | 11/1999 | Makiyama et al. | |
| 6,073,168 A * | 6/2000 | Mighdoll et al. | ............. 709/217 |
| 6,421,733 B1 | 7/2002 | Tso et al. | |
| 6,523,062 B1 | 2/2003 | Bridgman et al. | |
| 6,529,912 B2 | 3/2003 | Satoh et al. | |
| 6,647,260 B2 | 11/2003 | Dusse et al. | |
| 6,707,581 B1 | 3/2004 | Browning | |
| 6,711,740 B1 * | 3/2004 | Moon et al. | ................... 719/328 |
| 6,715,129 B1 * | 3/2004 | Hind et al. | .................... 715/239 |
| 6,766,296 B1 | 7/2004 | Adachi | |

(Continued)

FOREIGN PATENT DOCUMENTS

EP 0 768 807 A 4/1997

(Continued)

OTHER PUBLICATIONS

Girardot. M. el al. "Miliau: An Encoding Format for Efficient Representation and Exchange of XML Over the Web". Computer Networks and ISDN Systems, North Holland Publishing. Amsterdam, NL, vol. 33, No. 1-6, Jun. 2000, pp. 747-765, XP001005949.

(Continued)

*Primary Examiner* — CongVan Tran
(74) *Attorney, Agent, or Firm* — Ogilvy Renault LLP

(57) ABSTRACT

Systems and methods for processing documents are disclosed. Documents received at a data server are transcoded using locally stored or generated code books. Code books for transcoded documents received at a wireless mobile communication device are either retrieved from a memory on the device or requested from a data server. In response to a code book request, a data server retrieves a requested code book from a local memory or generates the requested code book and returns the requested code book to a requester. A wireless mobile communication device may also generate and transcode XML documents using a locally stored code book, a locally generated code book, or a code book received in response to a code book request.

18 Claims, 15 Drawing Sheets

U.S. PATENT DOCUMENTS

| | | |
|---|---|---|
| 6,978,316 B2 | 12/2005 | Ghaffar et al. |
| 6,985,719 B2 | 1/2006 | Leppinen et al. |
| 7,020,685 B1 * | 3/2006 | Chen et al. .................... 709/204 |
| 7,020,721 B1 * | 3/2006 | Levenberg .................... 709/246 |
| 7,031,654 B2 | 4/2006 | Yamaguchi |
| 7,046,996 B1 | 5/2006 | Andersen |
| 2002/0087596 A1 | 7/2002 | Lewontin |
| 2002/0087655 A1 | 7/2002 | Bridgman et al. |
| 2002/0103823 A1 | 8/2002 | Jackson et al. |
| 2002/0107985 A1 | 8/2002 | Hwang et al. |
| 2002/0176582 A1 | 11/2002 | Aull |
| 2002/0180785 A1 | 12/2002 | Simpson et al. |
| 2002/0198964 A1 | 12/2002 | Fukazawa et al. |
| 2003/0061299 A1 | 3/2003 | Brown et al. |
| 2003/0061386 A1 | 3/2003 | Brown et al. |
| 2004/0078362 A1 | 4/2004 | Kim et al. |
| 2004/0203939 A1 | 10/2004 | Li et al. |

FOREIGN PATENT DOCUMENTS

| | | |
|---|---|---|
| JP | 05204800 | 8/1993 |
| JP | 07244620 | 9/1995 |
| JP | 08190544 | 7/1996 |
| JP | 09107544 | 4/1997 |
| JP | 11168390 | 6/1999 |
| JP | 11272655 | 10/1999 |
| JP | 2001084183 | 3/2001 |
| JP | 2001217720 | 10/2001 |
| WO | WO/9843177 | 10/1998 |

OTHER PUBLICATIONS

Sperberg-McQueen C.M. et al. "HTML to the Max: A Manifesto for Adding SGML Intelligence to the World-Wide Web". Computer Networks and ISDN Systems, North Holland Publishing. Amsterdam, NL, vol. 28, No. 1, Dec. 1, 1995, p. 3-11, XP004001206.

"Applet Caching in Java Plug-In", Aug. 2000, XP002256443. Retrieved from the Internet: URL: http://java.sun.com/j2se/1.3/docs/gui/de/misc/appletcaching.html> [retrieved on Oct. 2, 2003]. The whole document.

* cited by examiner

SYSTEM AND METHOD FOR PROCESSING EXTENSIBLE MARKUP LANGUAGE (XML) DOCUMENTS

RELATED APPLICATION

This application is a divisional of U.S. application Ser. No. 10/849,833 filed on May 21, 2004 now U.S. Pat. No. 7,636,565, the entirety of which is hereby incorporated by reference, which is continuation of International Application No. PCT/CA02/01778 filed Nov. 21, 2002, the entirety of which is hereby incorporated by reference, which claims priority to Provisional Application No. 60/331,998 filed Nov. 23, 2001, the entirety of which is hereby incorporated by reference.

BACKGROUND OF THE INVENTION

1. Field of the Invention

This invention relates generally to wireless communications and wireless mobile communication devices. In particular, the invention relates to general Extensible Markup Language (XML) support for wireless communication devices.

2. Description of the State of the Art

XML is quickly becoming one of the most common schemes for exchanging data between different computer systems. For transfer over wireless or other narrowband communication systems however, an efficient encoding scheme is required to reduce the size of XML documents for transmission. Perhaps the most popular encoding scheme for preparing XML documents for wireless transmission is Wireless Application Protocol (WAP) Binary XML, or WBXML. WBXML relies on token tables or code books to encode and decode XML. The WBXML specification uses the term "code page" to signify a set of token to tag equivalences. A code page can have no more than 256 entries, so there may be several code pages. The term "code book" is used herein to denote a set of one or more code pages. A code book is therefore a set of lookup tables that maps between XML tags or attributes and their corresponding tokenized equivalents.

Known XML solutions for wireless communication systems use two copies of token tables. One copy is typically embedded at an information gateway, a server or other information source for transcoding or tokenizing from XML to WBXML, whereas another copy is embedded in a mobile communication device side of software application code, which parses and/or decodes the tokenized WBXML. In fact, most known WBXML client software applications have the encoding scheme embedded in the parser. This works well if the encoding scheme is well known. However, for new XML dialects, there is no known encoding scheme. A software application developer that wishes to use a new XML dialect must invent an encoding scheme and/or create both a transcoder to do the encoding and a parser for the client software application.

In such systems, a mobile communication device or possibly software applications installed on such a device must know how an XML document was encoded, that is, which token table was used, by a WBXML encoder in order to process a received WBXML document. This means that an XML application in the mobile communication devices is normally configured for a specific type of XML corresponding to an encoding scheme used at a server or gateway. When an XML processor is implemented in computer software code for example, encoding schema is typically embedded into the software code, such that every time a new XML document type is received, both server software code and mobile communication device software code must be modified accordingly, which is costly, time consuming, and error-prone, particularly if different entities are responsible for server operations and mobile communication devices and applications. Further, if a WBXML parser receives a WBXML document generated from an XML document type that it has never previously processed and the code book for that particular XML document type is not embedded in the decoder or parser or a mobile communication device in which the decoder or parser is implemented, then the device and any software applications on the device are unable to process the WBXML document.

Therefore, there remains a need for a system and method for universal XML support on mobile communication devices which is not restricted to any particular encoding scheme so that XML-enabled applications are independent of a particular XML type and its encoding schema.

There remains a related need for a system and method for processing XML documents of any type.

There remains a further need for a system and method for supporting XML on mobile communication devices which support new XML document types without need to change the software code on the devices.

SUMMARY

According to an embodiment of the invention, a method of processing XML documents on a wireless mobile communication device comprises the steps of receiving a processed document from a data server, wherein the processed document is generated by transcoding an XML document using a code book, determining whether the code book is stored on the wireless mobile communication device, requesting the code book from the data server where the code book is not stored on the wireless mobile communication device, receiving the code book from the data server, and transcoding the processed document using the code book to recover the XML document.

A related system of processing XML documents on a wireless mobile communication device comprises a receiver configured to receive a processed document from a data server, wherein the processed document is generated by transcoding an XML document using a code book, a code book system comprising a cache for storing code books, and a transcoding system coupled to the receiver and to the code book system and configured to parse the processed document, to request the code book from the code book system, and to transcode the processed document using the code book to recover the XML document, wherein the code book system is configured to determine whether the code book is stored in the cache when the code book is requested by the transcoding system, to provide the code book to the transcoding system where the code book is stored in the cache, and to request the code book from the data server, receive the code book from the data server, and provide the code book to the transcoding system where the code book is not stored in the cache.

According to another embodiment of the invention, a system of processing documents comprises a code book system configured to receive code book requests and to provide a code book responsive to each code book request, a memory in the code book system configured to store code books, a transcoder system configured to receive documents, and, for each received document, to request a corresponding code book from the code book system and to use the code book to transcode the received document, and a code book builder configured to generate code books, wherein the code book system is further configured to determine whether a requested code book is stored in the memory, and to initiate the code book builder to build the requested code book and to receive the requested code book from the code book builder where the requested code book is not stored in the memory.

In accordance a further aspect of the invention, a method of processing documents comprises the steps of receiving a document from an information source, determining whether a code book for transcoding the document is stored in a code book system, generating the code book where the code book for transcoding the document is not stored in the code book system, and transcoding the document using the code book to generate a transcoded document.

A system of providing a code book in response to a code book request comprises a receiver configured to receive a code book request from a requester, the code book request identifying a requested code book, a code book cache storing a plurality of code books, a code book system configured to determine whether the requested code book is stored in the code book cache, a code book builder configured to generate the requested code book and to store the requested code book in the code book cache where the requested code book is not stored in the code book cache, and a transmitter configured to transmit the requested code book to the requestor.

A method of processing XML documents according to a still further aspect of the invention comprises the steps of receiving a processed document from a first data server, wherein the processed document is generated by transcoding an XML document using a code book, determining whether the code book is stored in a code book cache, requesting the code book from a second data server where the code book is not stored in the code book cache, receiving the code book from the second data server, and transcoding the processed document using the code book to recover the XML document.

A method of processing documents at a wireless mobile communication device for transmission via a wireless network comprises the steps of generating a document at the wireless mobile communication device, determining whether the document is associated with a referenced document definition, where the document is associated with a referenced definition, determining whether a code book for the referenced definition is stored in a code book cache, retrieving the code book from the code book cache where the code book is stored in the code book cache, and requesting the code book from a data server and receiving the code book from the data server where the code book is not stored in the code book cache, transcoding the document using the code book to generate a transcoded document, and transmitting the transcoded document via the wireless network.

Further features of the invention will be described or will become apparent in the course of the following detailed description.

DETAILED DESCRIPTION

Figure 1:
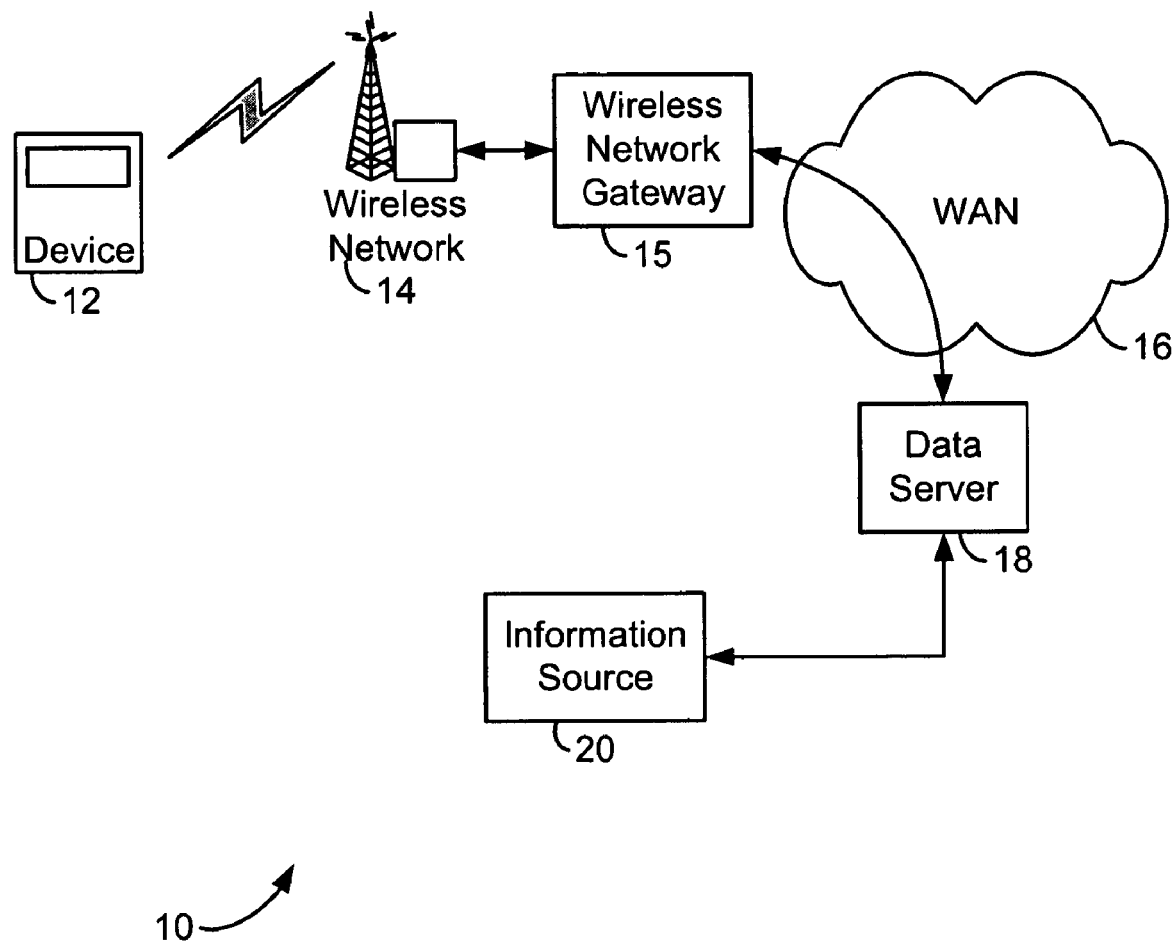
FIG. 1 is a block diagram of a communication system which provides access to an information source from a wireless mobile communication device.

FIG. 1 is a block diagram of a communication system which provides access to an information source from a wireless mobile communication device. In FIG. 1, the system 10 includes a wireless mobile communication device 12, a wireless communication network 14, a wireless network gateway 15, a wide area network (WAN) 16, a data server 18, and an information source 20.

The mobile device 12 is a wireless mobile communication device adapted to operate within a wireless communication network 14, such as a two-way communication device having at least data and possibly voice communication capabilities, for example. Depending on the functionality provided by the mobile 12, the mobile device may be a data messaging device, a two-way pager, a cellular telephone with data messaging capabilities, a wireless Internet appliance or a data communication device (with or without telephony capabilities), but is referred to hereinafter primarily as a "mobile device". The particular design of a communication subsystem (not shown) within the mobile device 12 will be dependent upon the communication network 14 in which the mobile device 12 is intended to operate. For example, a mobile device 12 destined for a North American market may include a communication subsystem designed to operate within the Mobitex™ mobile communication system or DataTAC™ mobile communication system, whereas a mobile device 12 intended for use in Europe may incorporate a General Packet Radio Service (GPRS) communication subsystem. Other types of mobile devices and networks are also contemplated. The systems and methods described herein may be implemented in conjunction with virtually any wireless network 14 and mobile device 12.

The wireless network gateway 15 shown in FIG. 1 provides an interface between the wireless network 14 and a WAN 16, which may, for example, be the Internet. Such functions as mobile device addressing, conversion of data between WAN protocols and wireless network protocols, storing and forwarding data to and from the mobile device 12, and other interface functions may be performed by the wireless network gateway 15.

It is possible that a data server 18 could be hosted by a network carrier or operator associated with the wireless network 14. In this case, the connection between the data server 18 and the wireless network gateway 15 could use a private network of the carrier instead of the WAN 16. The WAN 16 may then be used to communicate between the data server 18 and the information source 20. This hosted or public implementation of a data server 18 is a reasonable alternative approach to the system 10 shown in FIG. 1.

The data server 18 is a system which effectively provides the mobile device 12 with access to the information source 20. Through the data server 18, the mobile device 12 may access any information source 20, such as an Internet or web server, that can communicate with the data server 18. The information source 20 therefore requires no special applications or protocol support for wireless network communications, since it communicates with the data server 18, not directly with the mobile device 12. Although shown in FIG. 1 as a direct connection, the data server 18 and information source 20 may possibly communicate through a network such as a local area network (LAN) or WAN, including the Internet. In alternative embodiments, functions of the data server 18 may be incorporated into the wireless network gateway 15 or information source 20. Further embodiments of a wireless network gateway 15, data server 18 and information source 20 may also be apparent to those skilled in the art and as such are considered to be within the scope of the present invention.

Wireless networks and the Internet use similar addressing schemes, in which communication equipment such as the mobile device 12 in a wireless network or Internet-connected computers such as data server 18 and possibly information source 20 are identified by numerical addresses. For example, the mobile device 12 would be identified in the Mobitex network using a Mobitex Access Number (MAN), and public Internet nodes are identified using an Internet Protocol (IP) address scheme. However, differences between wireless network and Internet transport mechanisms typically prevent direct communication between information sources 20, the vast majority of which are Internet-based, and mobile devices such as the mobile device 12. Internet and other WAN communication protocols can also be "chatty", involving several exchanges to establish communications between a sender and recipient and relatively large amounts of overhead, which is not desirable in wireless network communications. Furthermore, content provided by information sources such as 20 is largely targeted for transmission over wired communication networks. As described above, XML documents are relatively large and should be compressed for transmission over wireless communication channels. The data server 18 bridges the gap between Internet-based and possibly other information sources 20 and the wireless network 14 with associated the mobile device 12. The functions of the data server 18 may include address mapping, content transformation and verification, and protocol mapping and optimisation, for example.

Although the mobile device 12, the wireless network 14, and the gateway 15 are shown in FIG. 1, the invention is also applicable to other types of mobile devices that may request or otherwise obtain XML documents. Processing resources and communication link bandwidth tend not to be as limited for desktop computer systems and wired communication links as for mobile devices and wireless communication networks. However, transcoding of XML documents as described herein not only reduces the size of data, but also makes a parser more efficient and easier to write. Reduced data size provides for faster transfer of XML documents via wired connections, whereas simpler and more efficient parsers similarly make desktop computer system software applications and any other data server client applications easier to develop. Therefore, it should be appreciated that the systems and methods described herein may be implemented in conjunction with wired or wireless communication systems and devices.

Figure 2:
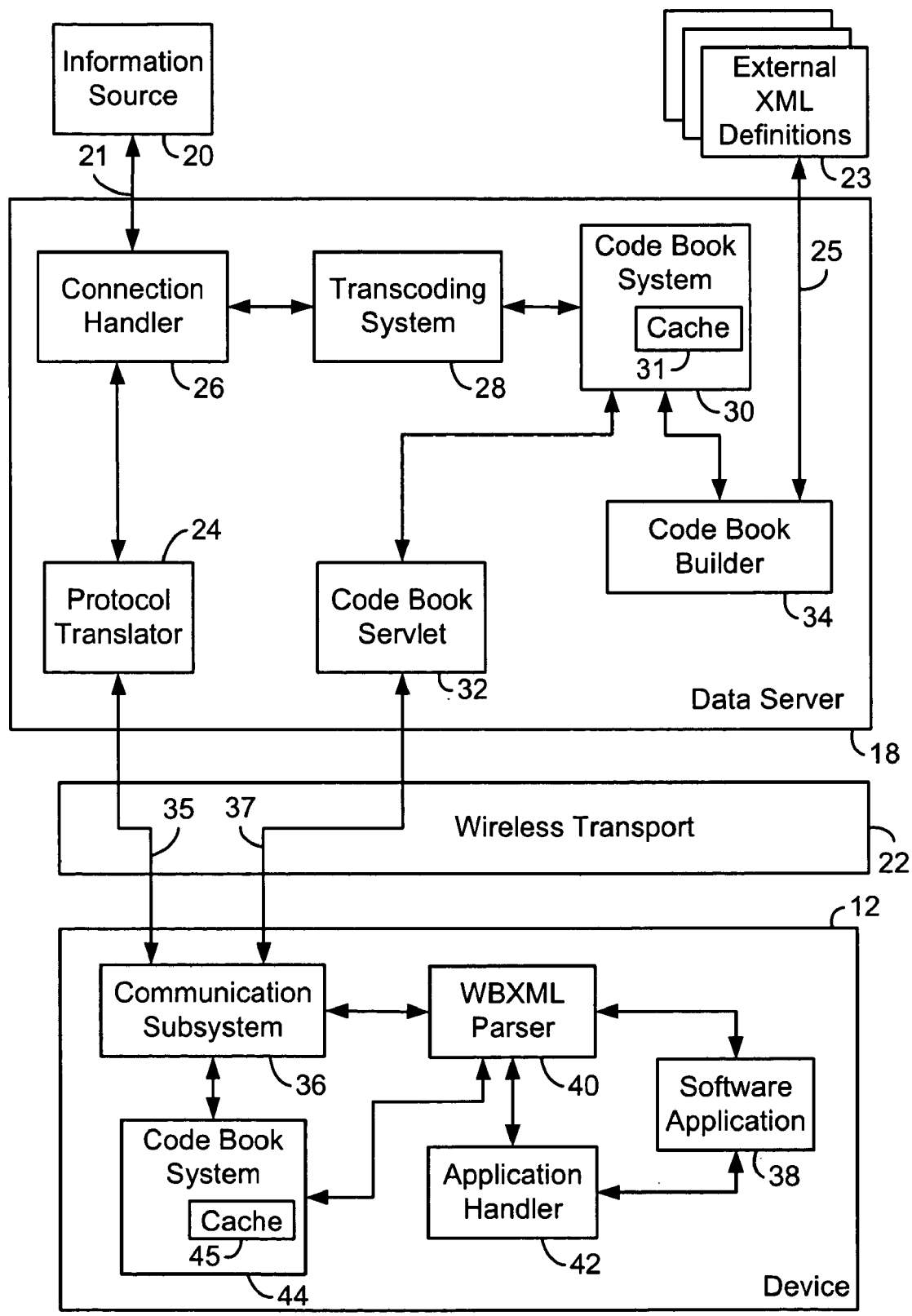
FIG. 2 is a block diagram illustrating internal elements of the mobile device 12 and data server 18 of FIG. 1.

Turning now to FIG. 2, an embodiment of the invention will now be described. FIG. 2 is a block diagram illustrating internal elements of the mobile device 12 and data server 18 of FIG. 1. As shown in FIG. 2, the data server 18 includes a protocol translator 24, a connection handler 26, a transcoding system 28, a code book system 30, a code book servlet 32, and a code book builder 34. The mobile device 12 includes a communication subsystem 36, a software application 38, a WBXML parser 40, an application handler 42, and a code book system 44.

Although not shown in FIG. 2, the wireless network 14, the wireless network gateway 15, and the WAN 16 shown in FIG. 1, as well as any other intervening communication links and networks via which the mobile device 12 and data server 18 communicate, have been designated generally as a wireless transport 22. Those skilled in the art will appreciate that the wireless transport 22 is intended to represent any system which provides for communication between the mobile device 12, which operates within a wireless communication network, and the data server 18, through one or more wired or wireless communication links or networks. It should therefore be apparent that the present invention is in no way limited to a communication system such as the system 10 in FIG. 1. The systems and methods described herein are not dependent upon any particular communication networks or protocols.

In the data server 18, the protocol translator 24 performs any necessary translation between protocols used for communications with the mobile device 12 through the wireless transport 22 over a link 35 and protocols used for communications with the information source 20 through communication link 21. In one contemplated embodiment of the invention, the data server 18 communicates with the wireless transport 22 over the link 35 using so-called IP Proxy Protocol (IPPP), a proprietary protocol developed by the owner of the present application, whereas the communication with information sources may use Hypertext Transfer Protocol (HTTP) or Transmission Control Protocol (TCP), for example. If the same protocols are used between the data server 18 and the wireless transport 22 and between the data server 18 and the information source 20, or the functions of the data server 18 are implemented at the information source 20, then the protocol translator 24 may not be required.

FIG. 2 shows only one connection handler 26, communication link 21 and information source 20. In an integrated system in which the data server 18 is associated with the information source 20, where the information source 20 provides remote data access and transcoding services, for example, the connection 21 is internal to the integrated system. However, in other embodiments, connection handler 26 and possibly further connection handlers (not shown) for different types of connections allows the data server 18 to simultaneously handle and process content from various information sources, including Internet-based sources.

Connection handlers such as 26 are intermediate objects that have the ability to process content from inbound and outbound connections to a data server 18. The particular connection handler(s) in a data server 18 can preferably be replaced and customized or additional handlers can preferably be added to a data server 18 as needed. A connection handler can optimise not just information content, but also a communication protocol. For example, some requests that would normally be sent to the mobile device 12 (such as a request for a password) may be resolved by the connection handler 26. This instance of a protocol optimisation can adapt so-called "chatty" protocols to be more wireless friendly by reducing the amounts of traffic sent over a wireless transport 22 to a mobile device 12, thereby reducing the effects of wireless network bandwidth constraints and latency.

In the case of a desktop computer system (not shown) instead of the mobile device 12, a gateway such as an Internet Service Provider (ISP) system or Application Service Provider (ASP) system could provide an interface to the data server 18. Where a data server supports both wired and wireless clients, different transports and protocol translators could be implemented for the different types of clients.

Outbound connections are made from a mobile device 12 in order to send data to and receive data from Internet nodes, for example. The data server 18 may receive connection requests from the mobile device 12 using a particular protocol, such as the proprietary protocol IPPP mentioned above, although other protocols might also be used. The data server 18 then establishes an Internet connection, according to protocol and routing information provided by the mobile device 12 in the connection request, and translates and maps that connection to start forwarding data in both directions. A filtration or transcoding process in the transcoding system 28 is invoked by the connection handler 26 whenever necessary, based, for example, on the type of content being passed over the connection. Such outbound connections and operation of the data server 18 and mobile device 12 will be described in further detail below, in the context of web browsing operations.

Inbound connections are used, for example, to implement a data push model. In this model, the mobile device 12 is sent information without having issued requests to fetch the information, as is the case with outbound connections. As described briefly above, a mobile device 12 may exist on a different network domain than Internet nodes. The data server 18 is responsible for bridging the Internet and wireless network domains. Thus, the data server 18 requires certain routing information to route traffic to the particular mobile device 12. In a push operation, at least some of this routing information must be provided by the Internet node, such as the information source 20, that issues a request to establish an inbound connection. The data server 18 may convert commonly known addressing schemes such as email or IP numbers into the appropriate wireless network address of an intended recipient mobile device.

Connection handlers in a data server 18 may be stream-based objects. When an outbound or inbound connection is requested, a virtual piped stream is established between the mobile device 12 and the appropriate connection handler 26. The connection handler 26 will be instantiated and started to process content for the established connection. Loading the connection handler 26 is based on a connection request, which preferably contains a reference to a connection handler name that may imply the type of traffic that would go through the virtual piped stream and the location of the connection handler 26 that must be loaded by the data server 18 if is not already loaded. The functions of connection handlers such as 26 include mapping Internet or other information source-side connections and mobile device connections, forwarding traffic between these connections, and loading and invoking the appropriate transcoders on information destined for the mobile device 12.

Every connection is preferably associated with an instance of a connection handler 26. This is true even for a connection that does not require that content be processed by the data server 18, for example when content received from an information source 20 has already been formatted for transmission through the wireless transport 22. This type of connection handler forwards content back and forward without making any sort of modification to the content, although it may make modifications to the protocol. For clarity, those skilled in the art will appreciate the distinction between the data or content (what the mobile device requested or is being sent) and the protocol (the "wrappers" and conversions required to deliver the data).

Connection handlers are also responsible for loading and executing appropriate content filters or transcoders, to convert an XML document to WBXML, for example. In this example, if the information source 20 returns an XML document in response to a request from the connection handler 26, then the connection handler 26 invokes an XML to WBXML transcoder (not shown) in the transcoding system 28. As described in further detail below, an XML to WBXML transcoder in the transcoding system 28 converts the XML content to WBXML content by replacing XML tags and attributes with WBXML tokens as specified in a code book. The resultant WBXML content is then sent by the connection handler 26, through the protocol translator 24 if necessary, to the mobile device 12. The WBXML encoded content is smaller in size and therefore can be more efficiently transmitted on a wireless network.

For previously processed types of XML, the code books are preferably stored in a data store or cache 31 in the code book system 30 and can subsequently be accessed by the XML to WBXML transcoder in transcoding system 28. The code book cache 31 may reside in a memory component such as a Random Access Memory (RAM), a disk drive or other store into which code book data may be written. In order to conserve memory space, a least recently used (LRU) replacement scheme or other memory management scheme may be used for the code book cache 31 by the code book system 30, such that the most often used code books are retained in the cache 31. Code books that are used particularly often may also be marked or designated for permanent storage, or stored in another data store or memory element. Alternatively, such code books that are expected to be frequently used may instead be generated by using the code book builder 34 and stored in a permanent code book cache (not shown), implemented, for example, in a Read Only Memory (ROM), to ensure that such code books are available to the data server 18 and not erased or overwritten.

The code book builder 34 can be used to build a code book for any XML document having an external referenced definition, such as a SyncML message for example, which has a MIME type registered with the World Wide Web Consortium (W3C) and has a corresponding publicly available code book. The code book builder 34, external XML definitions 23 which define the XML grammar for an XML document, and retrieval of such external definitions 23 via the connection 25 are described in further detail below. The code book servlet 32 handles code book requests from mobile devices such as 12 and is also described below.

In the mobile device 12, the communication subsystem 36 includes components associated with communication functions of the mobile device 12, such as one or more antennas, a receiver, a transmitter and related circuitry and modules (not shown). The communication subsystem 36 may be different in different types of mobile devices, and is dependent upon the particular wireless transport 22 with which the mobile device 12 is configured to operate.

One or more software applications 38 may be installed on the mobile device 12, including, for example, a messaging application, a browser, a data synchronization application, a calendar application, a task list application, and a calculator. Some of these software applications, a messaging application, for example, may involve communication functions, whereas others may be "local" functions, using mobile device-resident user interfaces (not shown) for receiving inputs and providing outputs. Since the present invention is applicable to mobile devices such as 12, which receive information content from remote information sources such as 20, the example software application 38 is shown with a link to the communication subsystem 36, through the WBXML parser 40. In this example mobile device 12, a request for information, including a Uniform Resource Locator (URL), for example, is passed to the parser 40 by the software application 38 or its associated application handler 42 when information is to be downloaded to the mobile device 12 from a remote location. The software application 38 is thereby enabled for receiving and possibly sending information via the communication subsystem 36. It should be noted that other software applications (not shown) may also interact with the communication subsystem 36, and the software application 38 may interact with other mobile device components, including, for example, a mobile device keyboard or keypad, a display screen, memory elements, further input or output components, and even other software applications.

The WBXML parser 40 parses WBXML content such that any WBXML tokens are properly applied and the content can be processed by the application handler 42 on behalf of software application 38. Two types of parsers are available for parsing XML documents: Event-based parsers and tree-based parsers. An event-based parser is faster and consumes less memory than a tree-based parser and so may be more suitable for mobile devices. An event-based parser reports parsing events directly to the software application 38 through callback methods. Software applications that use an event-based parser 40 implement the parser's event handlers, such as the application handler 42, to receive parsing events. The application handler 42 is a set of application-specific callbacks that the parser invokes in response to the data in a received WBXML document.

The code book cache 45 in the mobile device code book system 44, like the code book cache 31 in the data server 18, may be implemented in a RAM or other data store into which new code books may be written and from which previously stored code books may be retrieved. An LRU replacement scheme or other memory management scheme may be used to limit the size of the code book cache 45. As described above, particular code books, especially those most frequently used or expected to be most frequently used, may be designated for permanent storage in the code book cache 45 or stored in a different mobile device code book cache (not shown).

When WBXML content is received by the mobile device 12, the WBXML parser 40 is invoked to parse the received WBXML content. The parser 40 requests the code book from the code book system 44. If the WBXML document is of a known or previously processed type and its corresponding code book is stored in the code book cache 45, then the code book is returned to the parser 40 by the code book system 44 and used to parse the received WBXML document. If the WBXML document is of a type for which no code book is available from the code book cache 45, then in accordance with an aspect of the invention described in further detail below, the code book is requested from the data server 18 by the code book system 44, stored to the code book cache 45, and then returned to the parser 40 and used to parse the WBXML document. In one embodiment of the invention, the mobile device code book cache 45 initially contains only "permanent" code books, if any, and the code book system 44 requests any further code books from the data server 18 as they are required. Depending on the type of software application 38 and its corresponding application handler 42, the application handler 42 may request a code book from the mobile device code book system 44 and transcode received WBXML document elements into XML. Thus, the parser 40 and application handler 42 effectively comprise a transcoding system on the mobile device 12, configured to parse and transcode received WBXML documents to recover original XML documents. The transcoding system may include just the parser 40, where the parser 40 performs both parsing and transcoding, or both the parser 40 and the application handler 42, where the application handler 42 performs transcoding. Mobile device processing of received WBXML content is described in detail below.

As shown in FIG. 2, code book requests may be made by the mobile device 12 and code books may be returned to the mobile device 12 by the data server 18 over a different link 37 and using a different protocol than those used for information requests and document transfers. The example code book request and transfer link 37 shown in FIG. 2 and the communication protocol used thereon provides for communication directly with the code book servlet 32 on data server 18 and therefore does not require protocol translation by the protocol translator 24. In alternate embodiments however, code book requests and transfers may be accomplished through the protocol translator 24.

Figure 3:
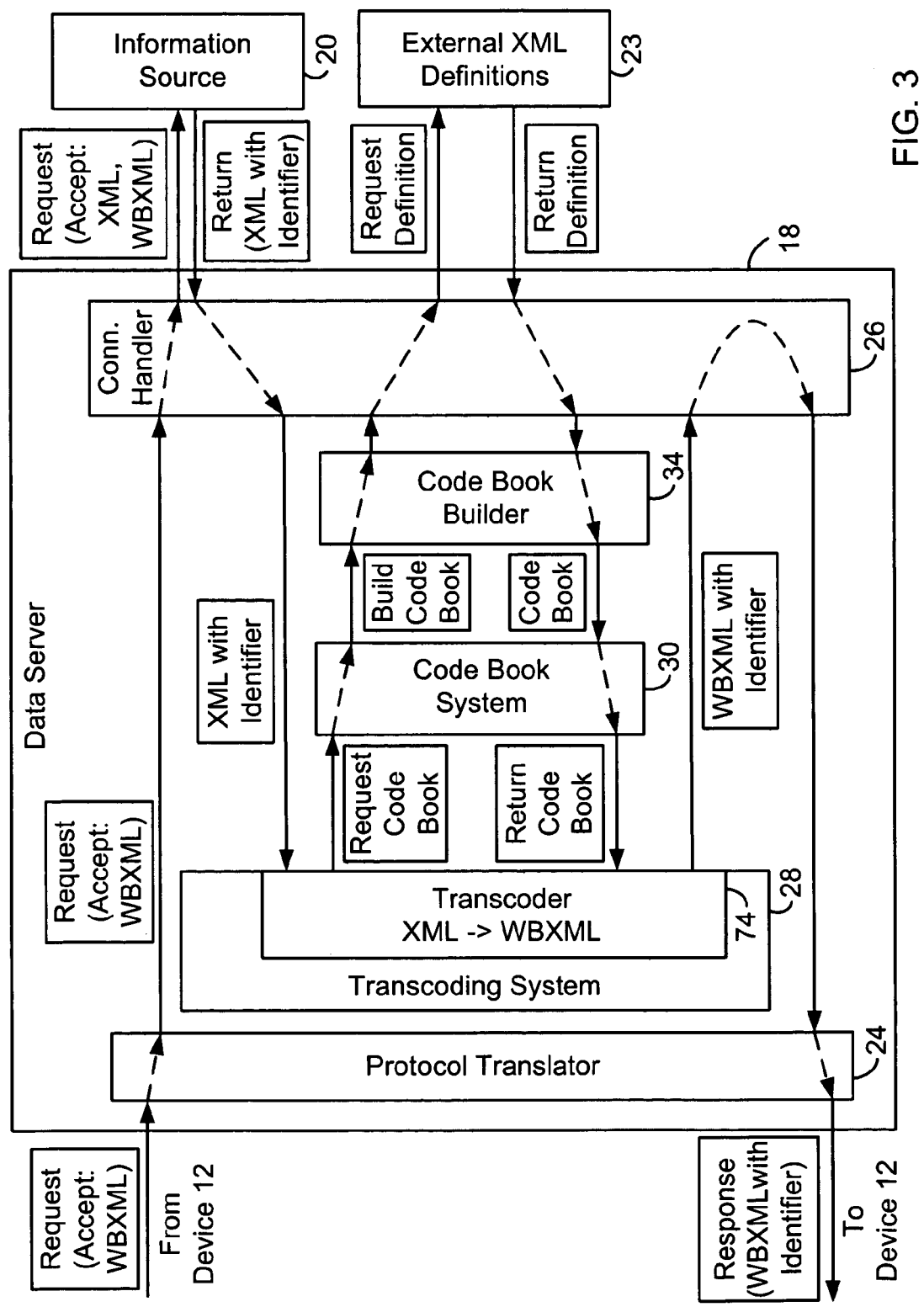
FIG. 3 is a signal flow diagram illustrating the operation of a data server 18 in response to a connection request from a mobile device 12.

The operation of the system shown in FIG. 2 will now be described in further detail. FIG. 3 is a signal flow diagram illustrating the operation of a data server 18 in response to a connection request from a mobile device 12. As described above, the mobile device 12 may communicate with a data server 18 using a protocol different than the protocol used between the data server 18 and information source 20, such as the proprietary IPPP. In such arrangements, although the connection request conforms to a particular protocol, the request may specify a connection type or particular connection handler associated with a different protocol. Therefore, when information is requested from an information source 20 by the data server 18 via HTTP, for example, a request sent from a mobile device 12 could be an HTTP request, if mobile device 12 to data server 18 communications are via HTTP, or a request which conforms to another protocol but specifies HTTP or an HTTP connection handler and thus is interpreted by the data server 18 as an HTTP request. The protocol translator 24 translates requests from the mobile device 12 whenever necessary.

It will be apparent that FIG. 3 shows only the elements of the data server 18 directly involved in an information request and response operation. The code book servlet 32 is involved in code book request management and is therefore not shown in FIG. 3 to avoid congestion in the drawing.

In FIG. 3, a request from the mobile device 12 is received by the data server 18 and translated if necessary into a protocol used for communication between the data server 18 and the information source 20. As shown, the request from the mobile device 12 specifies the type of content accepted in response to the request, WBXML in the example of FIG. 3. If the request from the mobile device 12 is an HTTP "get" request, for example, then WBXML may be specified as a MIME type in an accept-type field in a typical HTTP request header. The protocol translator 24 invokes the appropriate connection handler 26 and forwards the possibly translated request to the connection handler 26. For an HTTP request or a request which specifies an HTTP connection or HTTP connection handler, the invoked connection handler 26 is an HTTP connection handler. The connection handler 26 then sends a request to the information source 20 via connection 21 (FIG. 2), which may possibly be a direct connection or one or more network connections. The information source 20 may, for example, be a web server or other system configured to be accessible through the Internet.

In FIG. 3, the mobile device 12 specifies WBXML as an accepted content type. However, the data server 18 can transcode received XML content into WBXML content accepted by the mobile device 12 and may therefore include XML instead of, or possibly in addition to, WBXML as an accepted content type in the request sent to the information source 20. In the example shown in FIG. 3, the request sent from the data server 18 includes both XML and WBXML as accepted content types. This type of request may be useful, for example, if an information source 20 cannot transcode XML data into WBXML data. The information source 20 may then return XML data instead of WBXML data in response to the request from the data server 18, even though the mobile device requests specifies WBXML as the accepted content type. Where the data server 18 is not configured to include additional accepted content types in a request to the information source 20, the information source 20 may nonetheless return requested content in a content type other than those specified in the request, or instead return an error or failure message indicating that the content cannot be provided in an accepted content type.

The information source 20 returns the requested content to the connection handler 26 as an XML document in the example shown in FIG. 3. The connection handler 26 passes the received XML document to the transcoding system 28, and in particular to the XML→WBXML transcoder 74. When implemented as software code, the transcoder 74 may be invoked by either the connection handler 26 or transcoder system 74 upon receipt of the XML document from the information source 20.

As described above, the XML→WBXML transcoder 74 converts XML tags and attributes to tokens, based upon mapping tables in a particular code book. The code book cache 31 on the data server 18 stores code books for "known" XML types, such as XML types for which the corresponding code books are permanently stored in the cache 31 and types that have been previously processed by the data server 18. Each code book in the cache 31 is identified and can be retrieved using a corresponding identifier, which may, for example, be a unique XML public identifier that normally appears in a DOCTYPE statement of a valid XML document, a URL that allows retrieval of an externally referenced definition as described in more detail below, a MIME type, or possibly a further identifier associated with an XML document or document type. In the example of FIG. 3, the returned XML document includes one or more of such identifiers. Using the identifier in the received XML document, the transcoder 74 requests the code book from the code book system 30. If the required code book is stored in the cache 31 (not shown in FIG. 3) in the code book system 30, then the code book is returned to the transcoder 74 and the XML document is transcoded into a WBXML document. In the example of FIG. 3 however, it is assumed for illustrative purposes that no code book is available in the code book system 30 for the identifier in the XML document returned by the information source 20.

When the data server 18 receives a valid XML document of a type for which no code book is stored in the cache 31 in the system 30, for example when the data server 18 has not processed XML documents of that type before, the code book is generated by the data server 18. The code book system 30, upon determining that the required code book is not available in its cache 31, will then initiate a code book build by the code book builder 34. The code book builder 34 retrieves a description or definition of the grammar used in that document from either an embedded (not shown) or external (23) source of XML definitions. The external source of XML definitions 23 may be embodied as a Document Type Definition (DTD) server, for example. A DTD is a formal description, in XML Declaration Syntax, of a particular type of document. It sets out which names and structures can be used in a particular document type. All documents which belong to a particular type and use the same DTD are constructed and named in a consistent and conformant manner. In another possible embodiment, a combination of namespaces and encoding schemas may implement a source of external definitions 23. External descriptions or definitions of XML grammar can also be split into multiple sources and many formats. In some XML documents, a grammar definition may be embedded into the document itself, such that the definition is extracted from the document. It should therefore be appreciated that the present invention is in no way dependent upon a particular type of document definition. The techniques described herein could be adapted to use one or more definition types, such as DTDs, schemas, and other document definitions, including both currently known and future definition types. In general, an external definition defines a set of valid strings that can occur in a document.

In FIG. 3, if the transcoder 74 requests a code book that is not cached in the code book system 30, then a definition for the XML document is requested from the source 23. Although the definition request is shown in FIG. 3 as being handled by the connection handler 26, a different connection handler (not shown) may instead be used to retrieve a definition from the external source 23 if the information source 20 and definition source 23 are configured for communications using different protocols. The code book builder 34 may possibly be configured for direct communication with one or more external definition sources 23, such as via the link 25 shown in FIG. 2. A grammar definition may be requested from an external source such as 23 using, for example, the identifier associated with the received document. For an external definition source such as 23, an address of the source 23 may also be required. This address could be supplied by the information source 20 with the XML document. Addresses for one or more external definition sources 23 may also be stored on the data server 18. The definition retrieval process may be simplified where a URL from which a definition can be retrieved is used as a document type identifier to index the code book cache. The same identifier is then used to request a code book from the code book system 30 and to request a definition from the external source 23.

When the requested definition is returned to the data server 18 by the definition source 23, it is used by the code book builder 34 to construct a new code book. The code book builder 34 converts the document grammar definition into mapping tables used to transcode the received document type into a WBXML document. The new code book is then forwarded to the code book system 30, which returns the code book to the transcoder 74 and may also store the code book in its cache. The new code book is then used by the transcoder 74 to transcode the XML document into a WBXML document.

WBXML allows some identifiers such as the public ID in a valid XML document to be encoded as a text string as well as an integer, normally for well-known XML types such as Wireless Markup Language (WML). The document type identifier used to index the code book cache in the code book system 30 could similarly be encoded and included in a transcoded WBXML document. The WBXML document, including the encoded identifier, is passed to the connection handler 26, which formats a response and forwards the response to the protocol translator 24. The protocol translator 24 performs any necessary protocol translation on the response and sends the response to the mobile device 12. The identifier in the response sent to the mobile device 12 is used by the mobile device 12 to retrieve the correct code book for parsing the WBXML document, as will be described in further detail below. It may also be possible to configure the data server 18 such that responses to the mobile device 12 are formatted by the protocol translator 24 instead of the active connection handler 26. The connection handler 26 then handles request/response operations between the data server 18 and external systems such as the information source 20 and definition source 23, and the protocol translator 24 handles communications with the mobile device 12.

In some cases, the XML document returned by the information source 20 might not be a known XML document type. Those skilled in the art will appreciate that although XML documents may use external referenced grammar descriptions or definitions such as a DTD to describe the markup available in any specific type of XML document, not all XML documents use such external descriptions. Provided that the rules of XML syntax are followed, a so-called "well-formed-only" XML document effectively defines its own markup by the use and location of elements instead of a formal definition. Other "well-formed" XML documents may also include an embedded definition.

If a well-formed-only or well-formed XML document with no external definition is returned to the data server 18 by the information source 20, then a code book is constructed as the XML document is processed by the transcoder 74 and stored to the code book cache 30. Since no formal grammar definition is available for a well-formed-only XML document, the code book is generated "on the fly". When a new element tag or attribute is encountered, a token is assigned by the transcoder 74. Any subsequent occurrences of the same tag or attribute are tokenized using this token assignment. For a well-formed document with an embedded definition, the definition is extracted from the document and provided to the code book builder 34 by the transcoder 74. A code book can then be generated substantially as described above. Alternatively, the transcoder 74 itself may extract and parse an embedded definition, assign tokens to tags in the document, and add the resultant tag-to-token mapping to the code book cache 31.

These types of XML documents include no DOCTYPE statement and thus no public ID, so some other unique identifier is preferably generated and used in the code book cache 31 and the WBXML document. This generated identifier can then be used by the mobile device 12 to determine which code book to use in parsing the WBXML document. It should be noted that every well-formed-only document or embedded definition may define elements and other constructs in a manner different than any other document, such that a generated code book and unique identifier may be associated with a particular document instead of a document type. Therefore, each time such a document is received, a new code book and identifier may be created.

In order to ensure that these generated identifiers are different, it may be desirable to use an identifier generation scheme that is dependent upon the content of a well-formed-only XML document, a document with an embedded definition, or an embedded definition. For example, a hashing algorithm could be used to hash the document or definition content to generate a unique identifier for each different document. A unique identifier could also be generated using information associated with the request/response operation through which the XML document was obtained, including, for example, some combination of a mobile device identifier, a request/response session identifier, and a time stamp of the request and/or response. Other data-dependent identifier generation schemes will also be apparent to those skilled in the art and as such are considered to be within the scope of the present invention. Hashing of a document is merely an illustrative example of one possible method for identifier generation. The particular identifier generation scheme used is preferably chosen or configured such that no generated identifier will be the same as any identifier associated with a known XML type. Otherwise, a generated identifier may potentially access an incorrect code book for a known document type instead of a new code book generated for an unknown type.

The WBXML specification also allows literal encoding of tags and attributes. Therefore, as an alternative for transcoding well-formed-only XML documents, only global tags, such as start elements and end elements for example, are tokenized. Other tags and attributes are then maintained as literal in the encoding, i.e. not tokenized. This saves processing time of token assignment and code book generation. In some circumstances, this may also be a viable alternative encoding scheme for documents with an embedded or external definition.

If a well-formed-only XML document has a MIME type registered with W3C and has corresponding token tables publicly available, then a third option for well-formed-only XML document encoding is to use the code book builder 34 to input the token and tag pairs and generate a code book "off-line". The generated code book can then be temporarily or permanently stored to the code book cache 31 and used every time an XML document of that MIME type is transcoded. In this case, MIME type could be used as an index to the code book cache 31. As above, using a URL or other address from which token tables for the MIME type are available as the identifier may advantageously simplify code book and token table retrieval operations.

Systems and methods according to the invention may support "ill-formed" XML documents as well. It is sometimes possible to clean up an XML document that is close to well-formed, for example if some closing tags are missing from the document. The XML→WBXML transcoder 74 may format such XML documents so that they are well-formed before converting them to WBXML.

Since code books generated for well-formed-only XML documents or documents with embedded definitions may be different for every document, it is possible that a mobile device would always have to request a code book whenever a WBXML document corresponding to such an XML document is received. Therefore, there may be little advantage in caching such new code books at a data server 18. This type of code book could instead be included in a response to the mobile device 12 from the data server 18, for example by prepending or appending the code book to the WBXML document. This would prevent using significant space in the code book cache 31 to store such one-use entries, but would not necessarily involve any performance penalty, since these code books would otherwise likely always be requested by a mobile device 12. Including such code books with a transcoded document also reduces loading of resources associated with code book requests.

Figure 4:
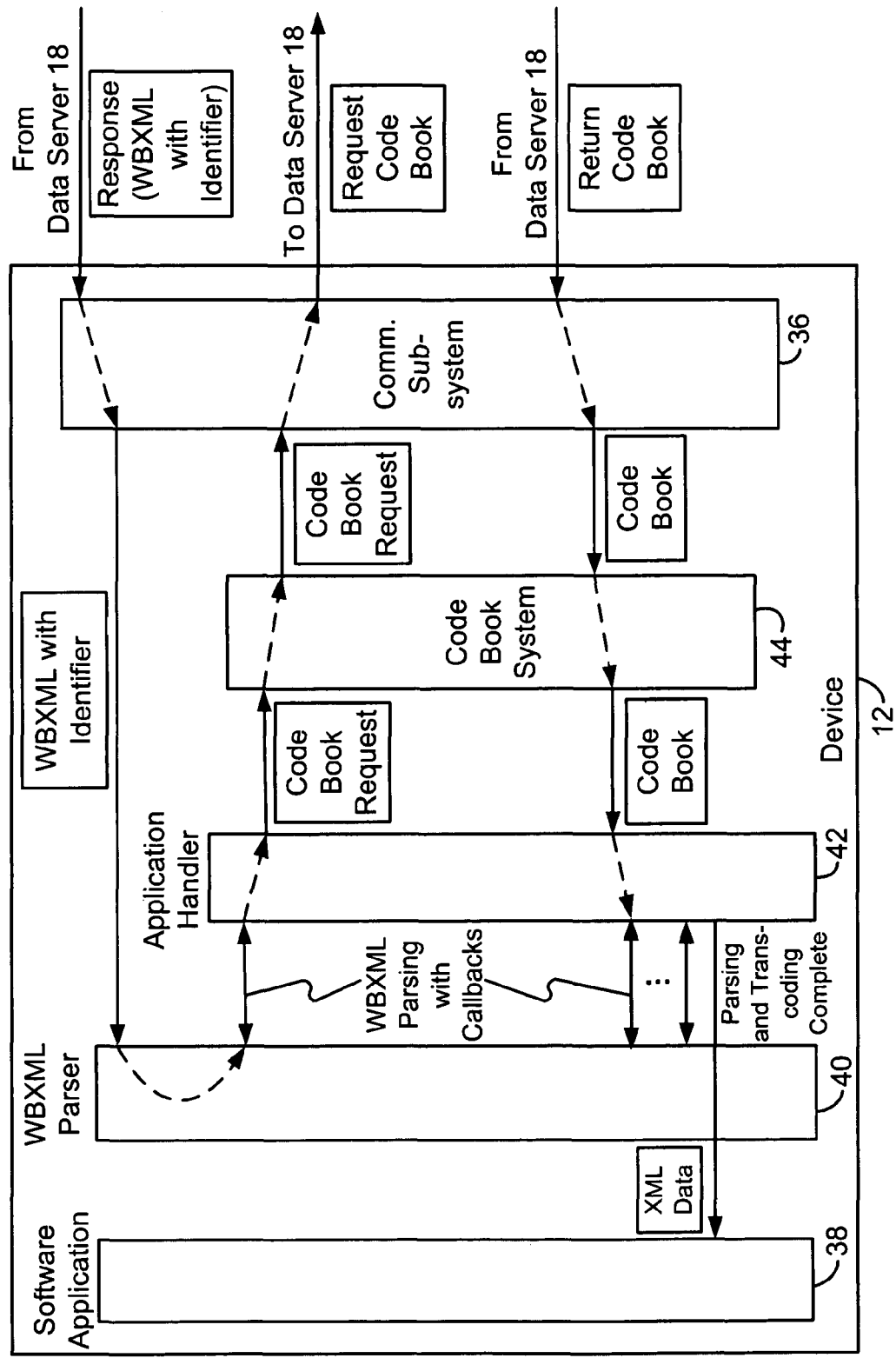
FIG. 4 is a signal flow diagram showing the processing of a document by a mobile device 12.
Figure 5:
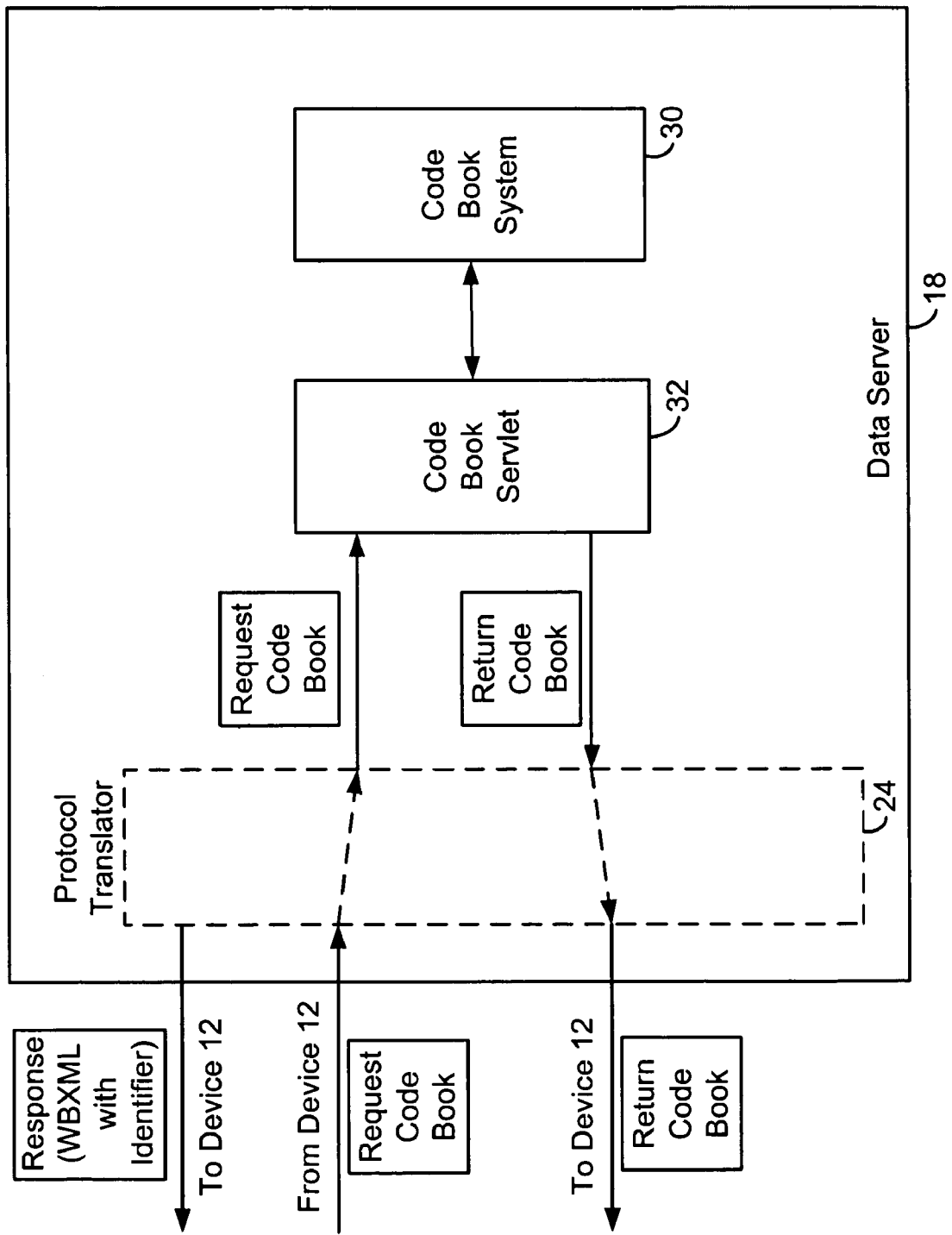
FIG. 5 is a signal flow diagram illustrating data server operations related to the mobile device processing shown in FIG. 4.

Instead of custom-building both software for the data server 18 and software applications for the mobile device 12 to operate only with certain specific known coding schemes as in known systems, the code book cache 31 is accessible by both the data server 18 and the mobile device 12. Code books stored in the code book cache 31 at the data server 18 need not be sent to the mobile device 12 unless requested by the mobile device 12 on the assumption that they may already be cached at the mobile device 12. The data server 18 effectively supplies a further service to the mobile device 12 whereby the mobile device 12 can request a code book for any particular document from the data server 18. These operations are described in detail below with reference to FIGS. 4 and 5. FIG. 4 is a signal flow diagram showing the processing of a document by a mobile device 12, and FIG. 5 is a signal flow diagram illustrating data server 18 operations related to the mobile device processing shown in FIG. 4.

In FIG. 4, the communication subsystem 36 in mobile device 12 receives a response to a connection request (not shown) including a WBXML document. The request/response process may be substantially as shown in FIG. 3 and described above, for example. It should be noted that although a response is shown in FIG. 3, a received WBXML document might instead be a document that was pushed to the mobile device 12 by an information source. In FIG. 4, the received WBXML document is intended to be used by a mobile device software application 38.

The transcoding of an XML document into WBXML by the data server 18 can be transparent to a user who wants to work with XML on the mobile device 12. To this end, the WBXML document is preferably passed to the WBXML parser 40. The WBXML parser 40 injects all parsing events to the application handler 42 for the software application 38 in the callback functions of the application handler 42. Received documents are thereby parsed into elements by the parser 40, and the elements are passed to the application handler 42. Transcoding of these elements of a WBXML document back into XML may possibly be handled by either the parser 40 or the application handler 42. If the parser 40 is a binary parser, for example, then the application handler 42 would normally be configured to transcode binary elements passed to it from the parser 40 using the appropriate code book. If the parser 40 is a string parser however, the parser 40 may transcode parsed string elements of a received WBXML document before passing the elements to the application handler 42. Although not shown explicitly in FIG. 4, it should be noted that a mobile device 12 may include more than one type of parser 40 and more than one software application 38 and associated application handler 42. Each software application 38 and application handler 42 may then be configured to operate with any one of the different types of parser. In the example shown in FIG. 4, the application handler 42 uses the code book to transcode document elements. It is also contemplated that elements may be transcoded as they are parsed, or transcoding may be performed on parsed elements after all or part of a received document has been parsed.

The first parsing callback function from the parser 40 to the application handler 42 preferably includes the identifier associated with the received WBXML document. This identifier is then used by the application handler 42 as a key to retrieve the appropriate code book from the code book cache 45 (not shown) in the code book system 44. In some embodiments, or for operations involving applications for which transcoding is handled by the parser 40 as described above, the code book may instead be requested by the parser 40.

If the code book is stored in the code book cache 45 (not shown in FIG. 4) in the code book system 44, it is returned to the application handler 42 and transcoding of elements of the received document can proceed based on the token, tag and attribute mapping specified in the code book. As described above, certain "permanent" code books, the most often used code books, or a number of most recently used code books may be stored in the code book cache in the code book system 44. In the example o FIG. 4 however, the code book is not available in the code book system 44 on the mobile device 12 and must therefore be requested from the data server 18. A code book request, including at least the identifier associated with the received document is prepared by the code book system 44 at the mobile device 12 and sent to the data server 18 via the communication subsystem 36 and communication link 37 (FIG. 2).

Referring now to FIG. 5, the request for the required code book is received by the code book servlet 32 in the data server 18. The code book servlet 32 retrieves the requested code book from the code book cache 31 (not shown) in the code book system 30 based on the identifier included in the code book request from the mobile device 12. The retrieved code book is returned to the code book servlet 32 and sent back to the mobile device 12 for use in parsing the WBXML document. It should be appreciated that code book requests and transfers may instead be handled by the code book servlet 32 through the protocol translator 24 if necessary. Also, although a code book servlet 32 is shown in FIG. 5, other interfaces to the code book system 30 in the data server 18 are also possible. The example shown in FIG. 5 assumes that the code book is available from the code book system 30. If this were not the case, for example if the code book had expired from the cache in the code book system 30 or the data server to which the code book request was submitted was not the data server from which the WBXML document was received, then additional operations would be performed to retrieve a grammar definition and convert it into a code book, as described in further detail below with reference to FIG. 8.

Returning now to FIG. 4, when the requested code book is received by the communication subsystem 36 on the mobile device 12, it is forwarded to the code book system 44, which stores the code book to the mobile device code book cache and provides the code book to the application handler 42 and/or parser 40, depending upon which component handles transcoding of parsed WBXML elements on the mobile device 12.

In the example shown in FIG. 4, parsing of the WBXML document and transcoding of parsed WBXML elements continues when the code book is available to the application handler 42. When parsing and transcoding is complete, the XML data may be sent to the software application 38, or to other mobile device software applications or subsystems (not shown). For example, parsed data may be stored in a mobile device data store, further processed by a mobile device software application, or displayed on a mobile device screen.

Once stored in the cache in the code book system 44, a code book may be designated for permanent storage, or stored only temporarily. Since memory resources on mobile communication mobile devices such as mobile device 12 tend to be limited and consume considerable power, most code books will likely be stored temporarily. For example, code books generated by the data server 18 for well-formed-only documents may be different for every well-formed-only document, and as such are preferably temporarily stored. Any of the memory management techniques described above may be implemented for the code book cache in the code book system 44.

Thus, according to an aspect of the invention, code books are de-coupled from software applications such that any application can request and use a code book at any time. This is in contrast to known systems, in which a particular encoding scheme is embedded into each software application or corresponding respective application handler.

Figure 6:
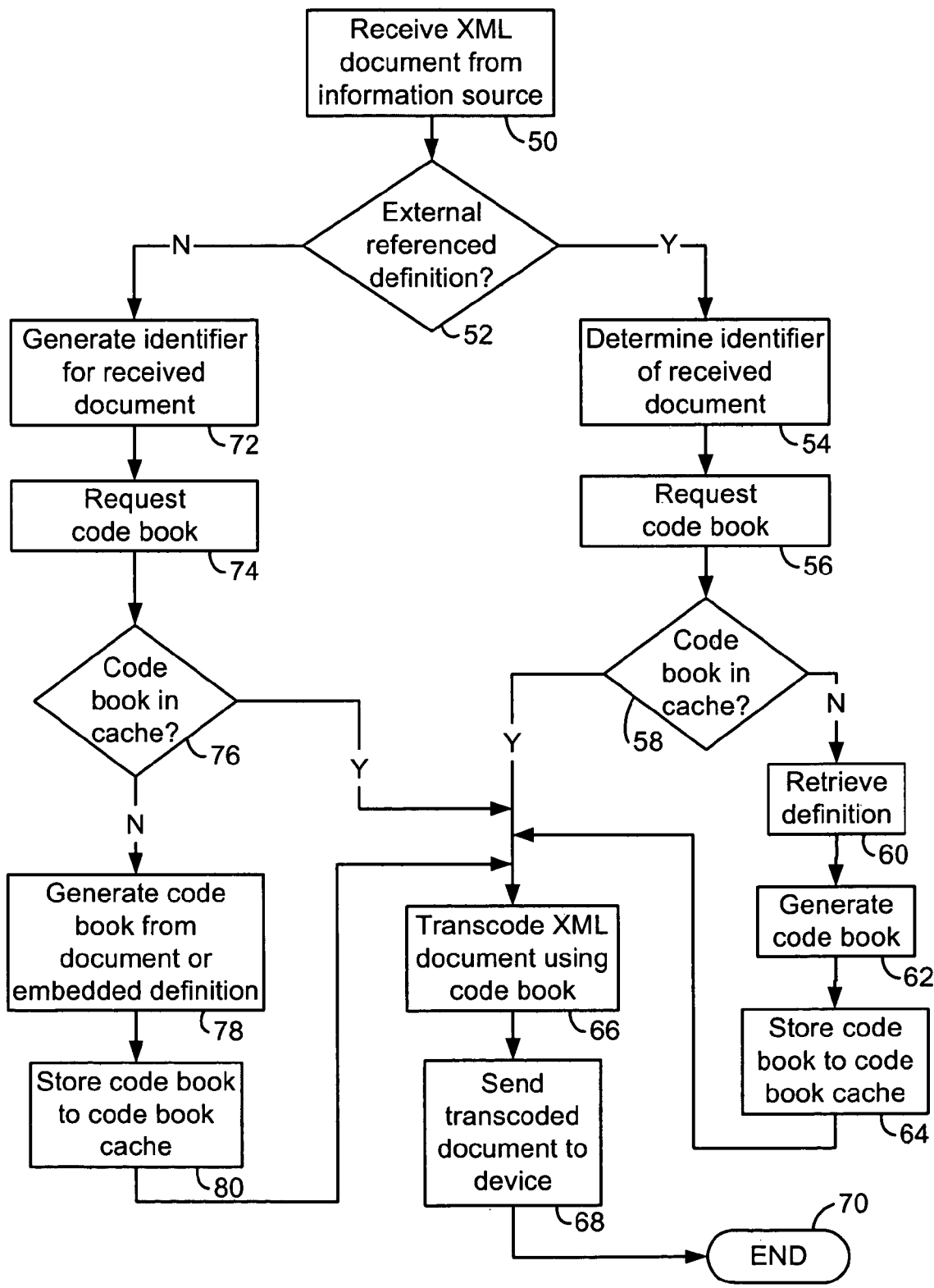
FIG. 6 is a flow chart illustrating data server processing of a received XML document.
Figure 7:
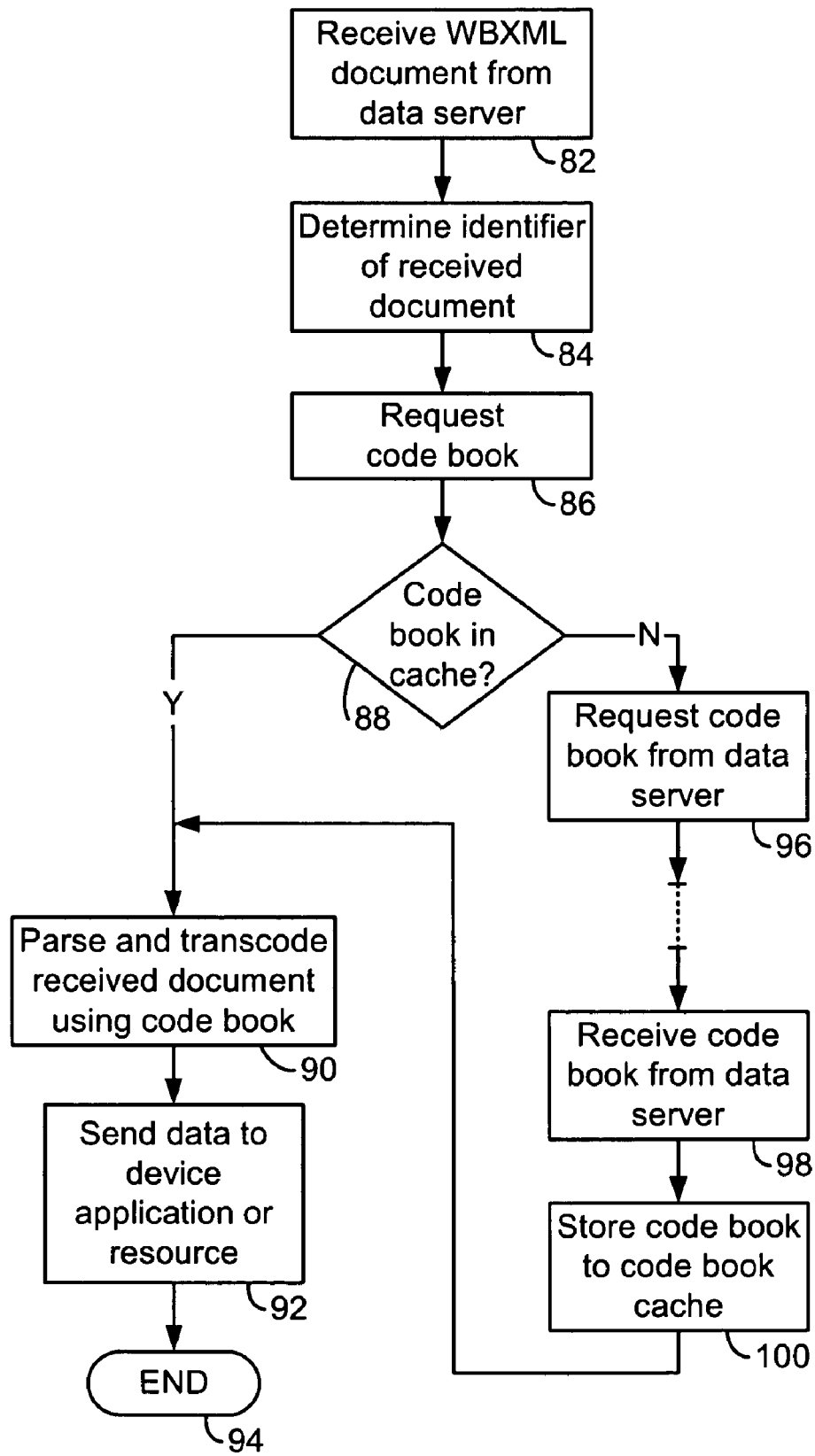
FIG. 7 is a flow chart showing the processing of a received transcoded document by a mobile device.

FIGS. 6 and 7 are alternative representations of data server and mobile device operations according to aspects of the invention. FIG. 6 is a flow chart illustrating data server processing of a received XML document. FIG. 7 is a flow chart showing the processing of a received transcoded document by a mobile device.

In FIG. 6, data server processing begins at step 50, when an XML document destined for a mobile device is received from an information source. The document may be received by the data server in response to a request from a mobile device and transmitted to the information source by the data server, or may instead be a document that is pushed to a mobile device, that is, transmitted without first being requested by the mobile device.

The data server then determines at step 52 whether the received document is a known XML document type having an external referenced formal grammar definition, such as a valid XML document. This may be accomplished by looking for a public ID in a DOCTYPE statement, for example. If the document has an external referenced definition such as a DTD, then the document type identifier of the document is determined at step 54, and used in step 56 to request the code book corresponding to the document type from the code book system in the data server.

If it is determined at step 58 that the code book corresponding to the identifier is stored in the code book cache of the code book system, then the data server proceeds to transcode the document at step 66 and sends the transcoded document to the mobile device at step 68. Data server processing of the received document is complete and the process ends at step 70. However, if the code book corresponding to the identifier is not in the code book cache (step 58), then a definition for the document is retrieved by the code book builder at step 60 and used to generate a new code book for that document type at step 62, as described above. The new code book is then stored to the code book cache at step 64 and the XML document is transcoded using the code book, at step 66. The transcoded document is sent to the mobile device at step 68 and the process ends at step 70.

XML documents such as new types of XML documents, well-formed-only documents that do not use a formal definition, or documents with embedded grammar definitions result in a negative determination at step 52. A unique identifier is generated at step 72, by hashing the document for example, and the code book may be requested from the code book system in step 74. If the code book is stored in the cache of the server's code book system, which corresponds to a positive determination at step 76, then the document is transcoded (66), sent to the mobile device (68) and the process ends (80) as described above. When no code book corresponding to the generated identifier is found in the code book cache, processing proceeds at step 78, to generate a new code book from the received document itself or an embedded definition if applicable. An embedded definition in a received XML document is preferably extracted from the document and used by either the transcoder or the code book builder to generate a new code book. The new code book is then stored to the code book cache at step 80, and the document is transcoded and sent to the mobile device (steps 66 and 68) and processing ends at step 70. As described above, a code book for a well-formed-only document is generated as the document is transcoded. Therefore, steps 78 and 66 may be performed simultaneously, after which the code book may be stored to the code book cache at step 80.

Since the code book and identifier for every received document that has no external referenced definition may be different, such that the likelihood of finding a code book for a well-formed document in a code book cache is relatively low, steps 74 and 76 may be bypassed in some embodiments of the invention. However, it is also possible that several different documents of this type may have a common code book. For example, documents from a particular source may all use the same embedded definition. If a unique identifier is generated for each of these documents, then the common code book is generated and stored to the code book cache each time one of the documents is received. According to a further aspect of the invention, the identifiers may be generated for such documents dependent upon the code book or definition instead of the document. For example, a code book may be generated and then hashed to generate the identifier. Although a common code book would still be generated at the data server each time a document which shares the common code book is received, only one copy of the code book would be stored at the data server. A code book-dependent identifier generation scheme may also provide significant advantages for a mobile device, as will be described in further detail below.

Alternatively, code books for documents having no external referenced definition may be embedded into or prepended or appended to transcoded WBXML documents to avoid occupying space in the code book cache with primarily one-time code book entries and to provide for general code book request operations which are not dependent upon any particular data server. This alternative scheme is described in further detail below in conjunction with FIG. 9.

Turning now to FIG. 7, when a WBXML document from a data server is received at a mobile device at step 82, the identifier of the received document is determined (step 84). As described above, some XML documents received at a data server might not include an identifier. However, according to an embodiment of the invention, identifiers are preferably generated at the data server and included in all WBXML documents sent to a mobile device. Therefore, WBXML documents received at a mobile device preferably include an identifier. Using the identifier determined at step 84, the code book can be requested from the mobile device code book cache at step 86. If the requested code book is found in the cache, the received document is parsed and transcoded at step 90, the resultant XML data is sent to a mobile device software application or other mobile device resource such as a data store or display at step 92, and mobile device processing ends at step 94. If the code book is not found in the code book cache on the mobile device, it is requested from the data server at step 96. After some time delay associated with the code book request, indicated by the dotted line between steps 96 and 98, the code book is received by the mobile device from the data server at step 98 and stored to the mobile device code book cache at step 100. Processing then proceeds at step 90 as described above.

Consider now an example of two WBXML documents that originated from different well-formed-only XML documents but have a common corresponding code book structure. At the data server, an identifier and code book would have been generated for each of the XML documents. If the identifiers are generated by the data server for well-formed-only documents dependent upon generated code books instead of document contents, then the resultant WBXML documents have the same document type identifier. When the first WBXML document is received at the mobile device, its code book is requested from the data server and stored to the mobile device code book cache. When the second WBXML document is received however, the code book corresponding to the identifier is found in the mobile device code book, provided of course that the code book entry has not already been deleted from or overwritten in the cache, thereby avoiding the code book request to the data server and its associated use of communication resources, mobile device power consumption, and time delay. The particular identifier generation scheme may be determined by a mobile device communication service provider, wireless communication network operator, data server owner or service provider, application service provider or the like, dependent upon desired data server and mobile device behaviours and possible optimizations of document or code book processing.

It should be apparent from the foregoing description that the present invention advantageously allows a mobile device and server to build respective code book caches, which provides for transfer and processing of both known and previously unknown types of XML documents. Code book caches on the mobile device and data server need not be the same, and may be updated to include new code books "on the fly", without requiring a server or mobile device shutdown or any software or hardware changes. A mobile device side software application could further preferably seed the mobile device code book cache upon installation if it knew in advance what kind of XML documents it would receive. This seeding could be achieved by creating the code book on the mobile device or by forcing the code book cache 44 to retrieve a code book from the data server prior to any data being sent.

In the above embodiments of the invention, a mobile device requests a code book from a data server when no code book corresponding to a document is found in the code book cache on the mobile device. However, it is important to note that the invention is in no way restricted to this type of code book request. A code book, like a document, may also be pushed to a mobile device for storage in its code book cache, when a new document type is established or a certain type of document is encountered or expected to be encountered frequently, for example. Code book requests or pushing of code books to mobile devices may also be used as alternatives to pre-loading particular code books in a mobile device code book cache. Instead of pre-loading a set of frequently used or permanent code books on a mobile device, a mobile device user or software application may request these code books from a data server when the mobile device is first configured for operation with the data server. A data server may similarly be configured to push a predetermined set of code books to a mobile device when the mobile device is registered or authorized for communication with the data server.

The above embodiments also show operations when a code book request is received by a data server 18 at which the requested code book exists in the server's code book cache. However, it is possible that a mobile device 12 may be enabled for communications with more than one data server 18. Therefore, a code book request might be sent to a data server that has not previously transcoded an XML document of the type for which a code book is requested, or a data server in which the requested code book is no longer stored in the code book cache. If the mobile device 12 is configured to request a code book from the particular data server 18 from which a WBXML or other transcoded XML document was received, then parsing operations on the mobile device 12 proceed substantially as described above. Alternatively, the data server 18 may be configured to distribute new code books, as they are generated, to other data servers or a central code book store (not shown) accessible to multiple data servers. New code books are thereby either stored in the code book cache of, or at least accessible to, multiple data servers, such that code book requests may be sent to any of a plurality of data servers when a code book is required by a mobile device 12.

Restriction of mobile devices 12 to send code book requests only to a particular data server 18 from which a transcoded XML document was received may not be an optimal solution, in that parsing and transcoding of received documents is then dependent upon a single data server. If the data server is shut down or otherwise becomes inoperable or unavailable to the mobile device 12, then received transcoded XML documents for which no code book has been stored in the mobile device code book cache 45 cannot be transcoded back into XML until the data server 18 that sent the document to the mobile device 12 is back in service. Distribution of code books among multiple data servers or to a central code book store may also require substantial amounts of data transfer and occupy data server resources. In addition, any delays in distributing a new code book by a data server may cause errors in code book request processing, for example if a new code book is requested from a data server before the new code book has been stored in the data server's code book cache or central code book store.

An alternative scheme which addresses these issues while providing for enhanced flexibility for retrieving code books from data servers will now be described with reference to FIG. 8, which is a signal flow diagram illustrating data server operations associated with a code book request according to a further aspect of the invention.

Figure 8:
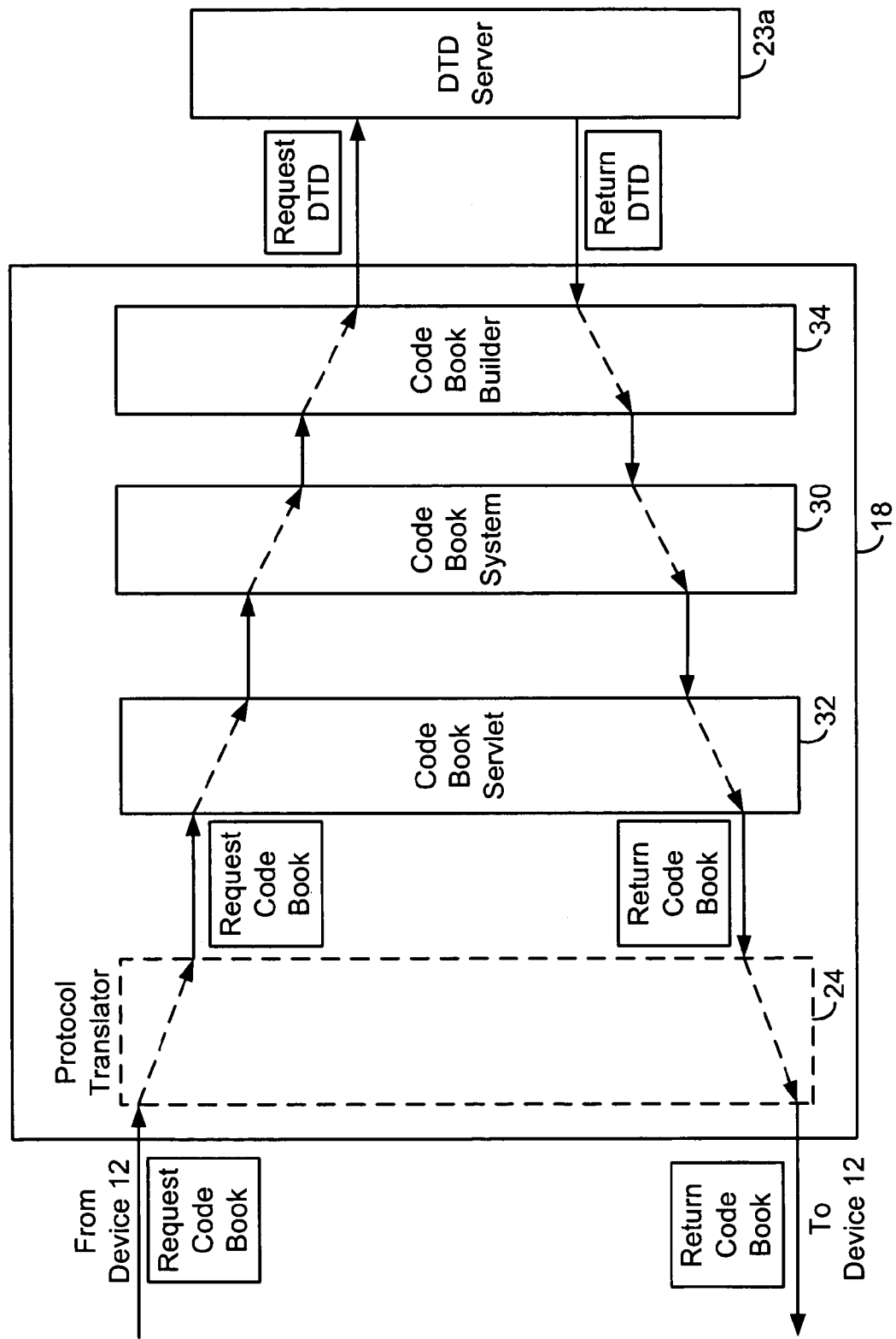
FIG. 8 is a signal flow diagram illustrating data server operations associated with a code book request according to a further aspect of the invention.

In FIG. 8, a code book request is received by the data server 18 from a mobile device 12. The code book request is received by the code book servlet 32, possibly through the protocol translator 24 if necessary. The code book servlet 32 then requests the code book from the code book system 30, which determines whether the requested code book is stored in the server code book cache (not shown) in the code book system 30. In the example of FIG. 8, the requested code book is not in the code book cache. This may occur, for example, when the data server 18 which receives the code book request from the mobile device 12 has not previously transcoded an XML document of the type with which the requested code book is associated. However, the code book may also be absent from the server code book cache if the code book was stored only temporarily and was overwritten in or deleted from the cache before the code book was requested by the mobile device 12.

According to this embodiment of the invention, a code book that is not found in the server code book cache in the code book system 30 is generated by the data server 18. In the example of FIG. 8, the code book is associated with an XML document that conforms to a DTD available from and external definition source shown as a DTD server 23a. When the code book system 30 determines that the requested code book is not available from its code book cache, the code book builder 34 is invoked and requests the DTD for the document from the DTD server 23a. The DTD is requested from the DTD server 23a, using the appropriate document type identifier. The DTD server then returns the DTD to the code book builder, which generates the requested code book using the DTD, substantially as described above. The code book is then forwarded to the code book system 30, which preferably stores the code book in its cache. The code book system 30 also returns the code book to the code book servlet 32, and the code book is returned to the mobile device 12, through the protocol translator 24 if required. At the mobile device 12, the requested code book is stored to the mobile device code book cache 45 and, if the code book request was made to enable transcoding of a received WBXML document, the code book is used to process the document, as described above.

Figure 9:
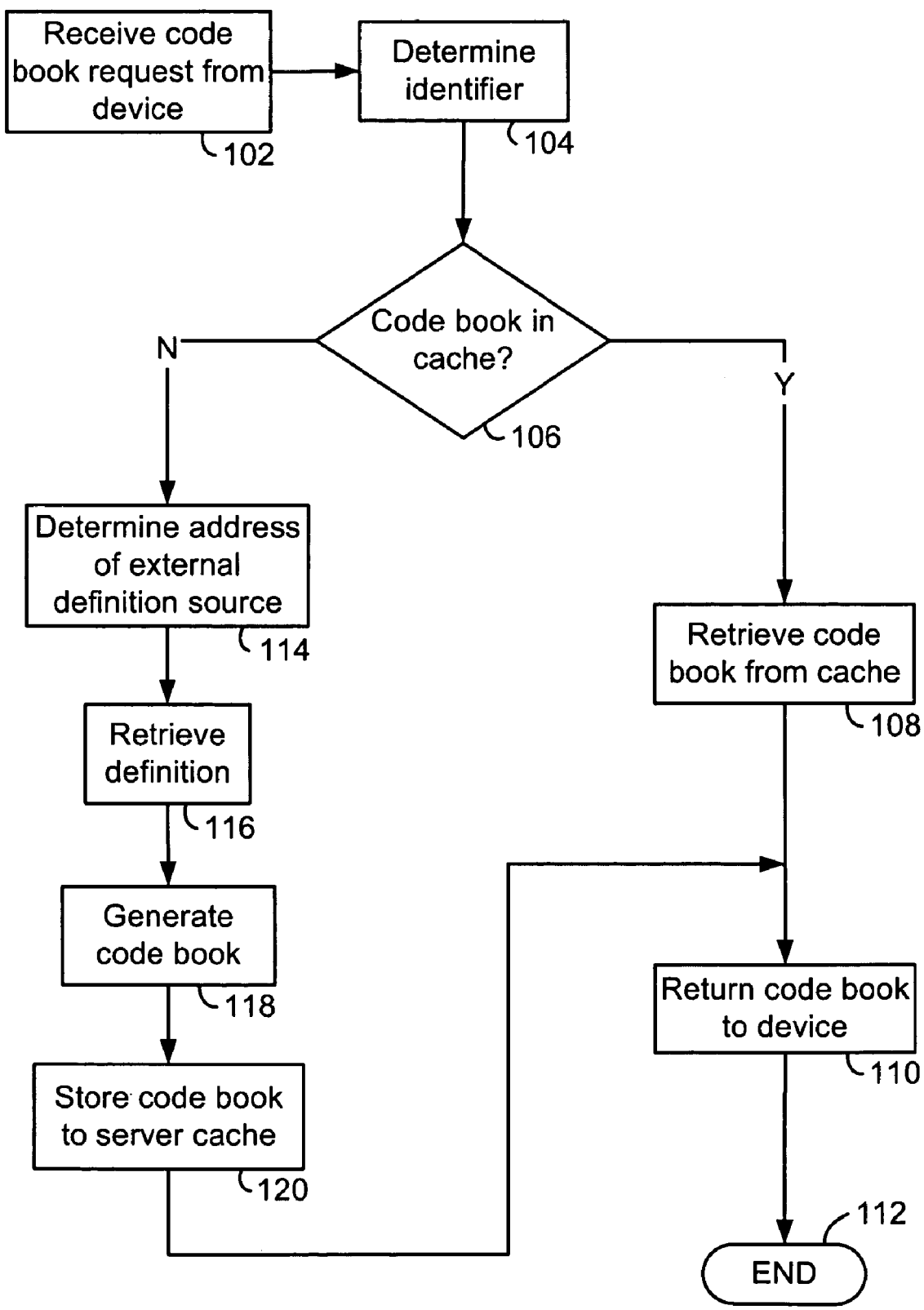
FIG. 9 is a flow chart showing data server processing of a code book request according to the embodiment of the invention shown in FIG. 8.

The server operations involved in the code book request scheme of FIG. 8 are shown in FIG. 9. FIG. 9 is a flow chart showing data server processing of a code book request according to the embodiment of the invention shown in FIG. 8. In FIG. 9, server processing begins when a code book request is received from a mobile device at step 102. The server then determines the identifier associated with the requested code book at step 104. As described above, the mobile device may insert a document public ID or other identifier into the code book request, such that the identifier is preferably extracted from the request. Using the identifier, it is then determined whether the requested code book is in the server's code book cache, at step 106. If the code book is in the cache, it is retrieved from the cache at step 108, returned to the mobile device at step 110 and the code book request processing ends at step 112.

When the code book is not in the cache, the server determines an address of an external definition source from which the definition can be retrieved, at step 114. When this address has been determined, the server retrieves the definition, at step 116, for example through a request and response process as described above. The requested code book is then generated at step 118, preferably stored to the server code book cache at step 120 and returned to the mobile device at step 110. Code book request processing is then complete, and ends at step 112.

One advantage of using a URL from which an external definition can be retrieved will be evident from FIGS. 8 and 9. When the identifier in the code book request points to the location of an external definition, then the data server need not resolve the identifier to determine the address of an external definition source (step 114 of FIG. 9), such as the DTD server 23*a*. As such, the request contains all the information required to retrieve an external definition, which simplifies code book request processing by a data server. Furthermore, this scheme provides for distribution of code book request loading across multiple data servers without requiring any sort of communication of code books between the data servers. For example, a first data server (DS1) may receive an XML document, retrieve the DTD, create the code book, transcode the XML document into a WBXML document and send the WBXML document to the mobile device. A second data server (DS2) could then receive the request for the code book from the mobile device. If the code book is not already in the cache at the server DS1, since DS1 generated and stored the code book in its cache, DS2 will have to retrieve the DTD and generate the code book. In this case, using the URL of the DTD as the identifier for the XML document type is much more useful than using a public ID or other identifier since the URL is all that is required to retrieve the DTD.

Using the public ID as the identifier would require either communication between DS1 and DS2 or restricting the mobile device to send the code book request only to DS1 as described above. Such communication and restrictions may make the entire system less robust and less scalable. However, where an identifier is associated with a URL of a definition, or the identifier can be resolved into such a URL, the benefits described above are achieved using the identifier. For example, the identifier could be a hash or other transformation of a URL of the definition, which a data server can resolve into the URL by consulting a hash table or other lookup table.

Figure 10:
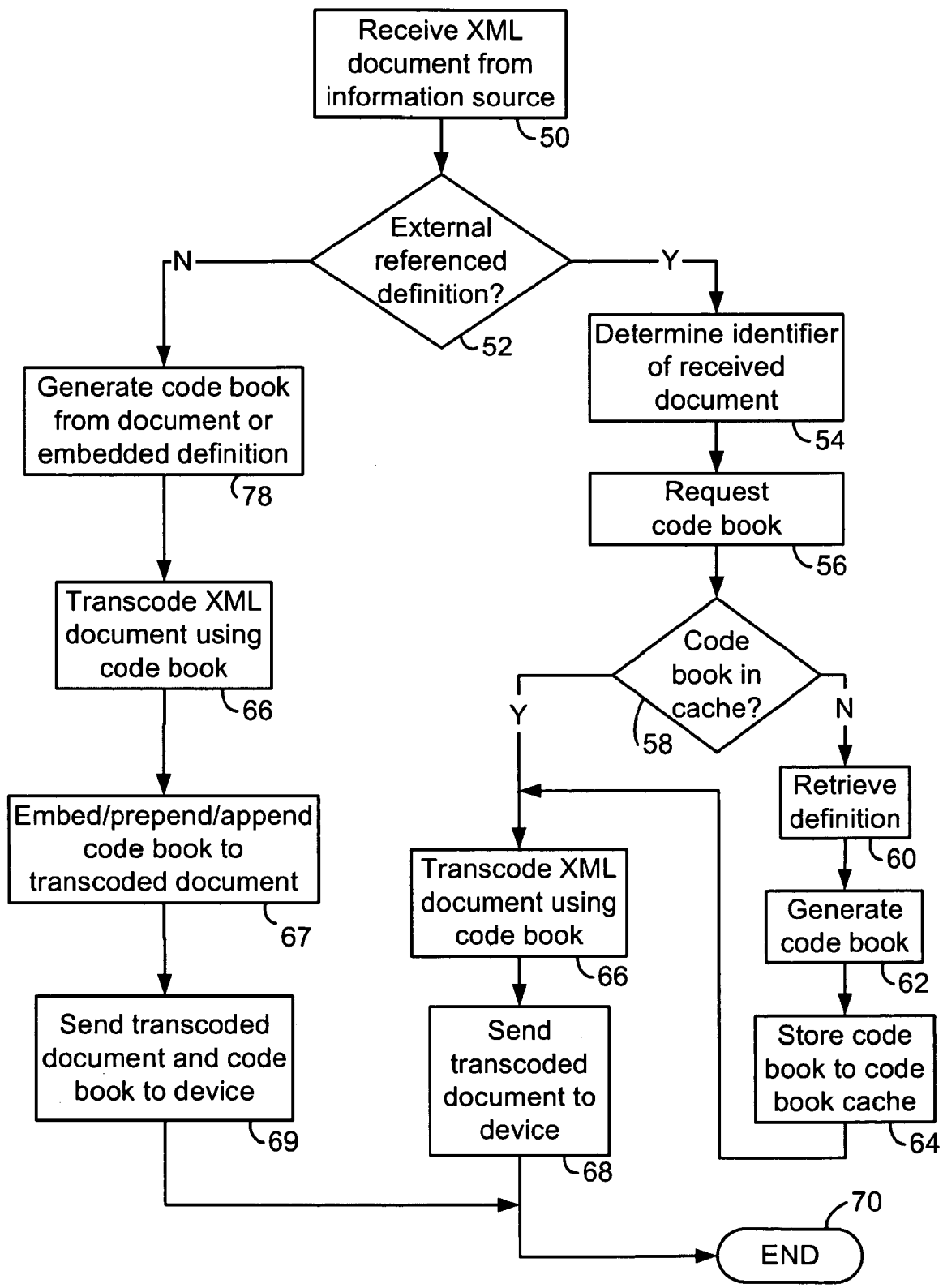
FIG. 10 is a flow chart illustrating exemplary data server processing of a received XML document to support the code book request scheme in FIGS. 8 and 9.

The scheme shown in FIG. 8 may be applied not only for XML documents which have an associated external DTD, but also for documents having a registered MIME type and publicly available token tables, or any other XML documents having a reference to an external publicly available document grammar definition. For other XML documents such as well-formed-only documents and documents with embedded definitions however, a code book is generated by a data server using the XML document or embedded definition. It is therefore preferable that such code books be embedded into or appended to transcoded documents sent to a mobile device 12. Then, any mobile device 12 requests only those code books associated with valid XML documents or XML documents having publicly available token tables, from which a code book can be generated by any data server having access to the code books, token tables, or other external definitions from which code books can be generated. In order to provide for the code book request operations shown in FIGS. 8 and 9, while maintaining support for XML documents with no external definition, data server operations may be modified as shown in FIG. 10. FIG. 10 is a flow chart illustrating exemplary data server processing of a received XML document to support the code book request scheme in FIGS. 8 and 9.

In FIG. 10, the processing of an XML document having an external referenced definition is substantially the same as shown in FIG. 6 and described above, and is therefore not described in further detail. When a document received from an information source at step 50 is determined not to have an external referenced definition (step 52), then a code book is generated from the document or an embedded definition at step 78, as described above. The received document is then transcoded at step 66. As also described above, the code book may be generated as the document is transcoded, such that steps 66 and 78 may actually be simultaneous operations. The code book is then embedded into or prepended or appended to the transcoded document at step 67, and the transcoded document and code book are sent to the mobile device at step 69. Since the code book is sent to the mobile device with the transcoded document, an identifier need not be generated and the code book need not necessarily be stored at the data server.

The foregoing description relates to transcoding XML documents into WBXML documents at a data server, sending transcoded documents to a mobile communication mobile device, and processing WBXML documents at the mobile device. However, in accordance with a further aspect of the invention, XML documents may also be prepared at a mobile device and transcoded into WBXML for transmission to a data server. The data server may then transcode WBXML documents received from a mobile device into XML for transfer to an intended recipient.

Figure 11:
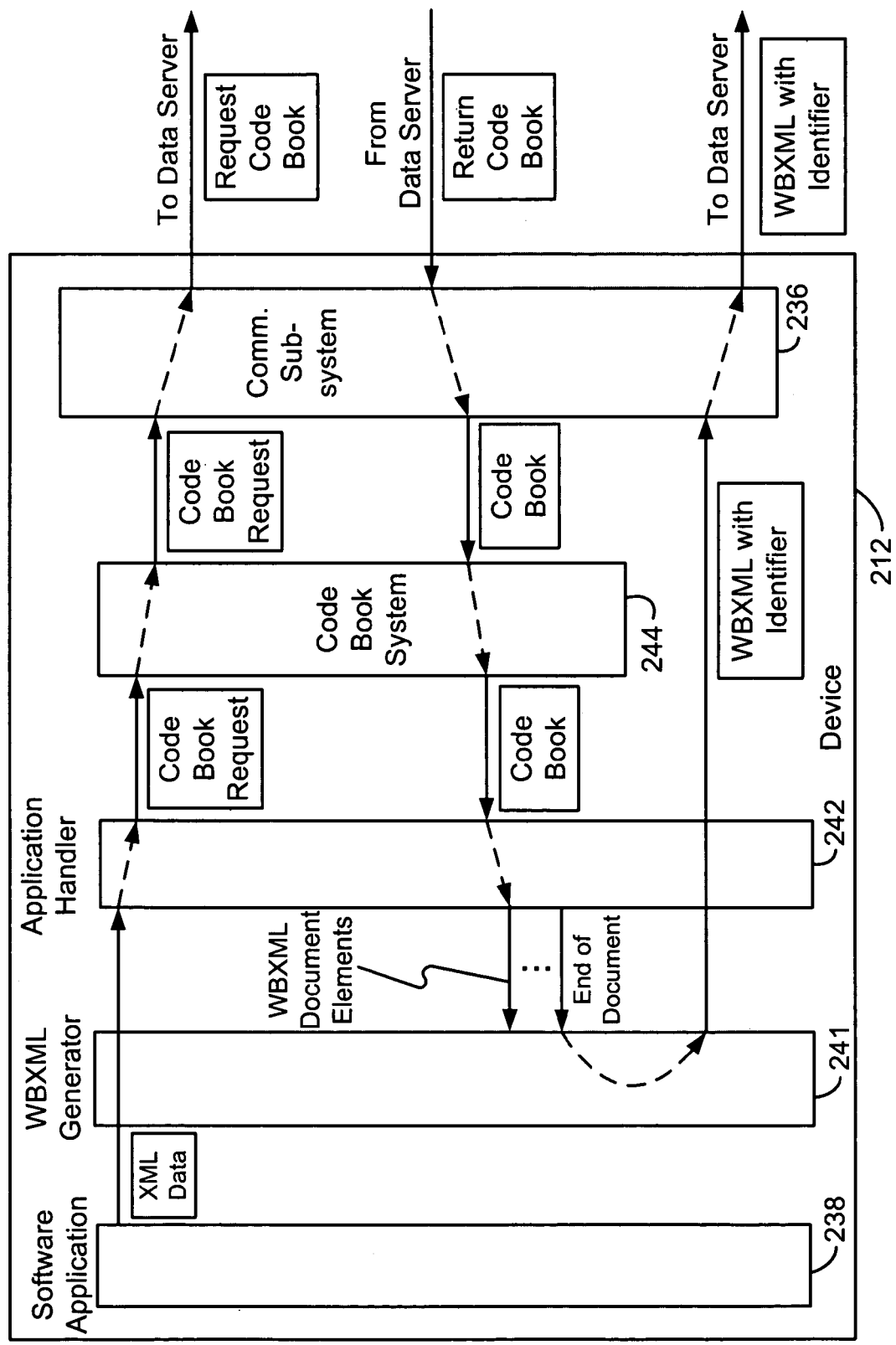
FIG. 11 is a signal flow diagram showing the creation of a WBXML document on a mobile device.

FIG. 11 is a signal flow diagram showing the creation of a WBXML document on a mobile device. The mobile device 212 shown in FIG. 11 is similar to the mobile device 12 shown in FIG. 4, but provides for creation of XML and WBXML documents. The communication subsystem 236 and code book system 244 may be the same as similarly labelled components in the mobile device 12. The software application 238 and its application handler 242 may also be the same as the application 38 and handler 42 in FIG. 4, for example if the software application 38 is configured to both receive and generate XML content. However, it should be appreciated that any mobile device software application may either receive XML data, generate XML data or both, and that a mobile device may include more than one type of software application.

The WBXML generator 241 performs the inverse operations of the WBXML parser 40, in that instead of parsing document elements from a WBXML document, the WBXML generator 241 assembles document elements into a WBXML document. Transcoding of XML document elements into WBXML elements may be handled by either the WBXML generator 241 or the application handler 242, depending upon the configuration of the mobile device 212, software application 238 and its handler 242. In the example mobile device 212, the application handler 242 transcodes XML document elements into WBXML document elements, although a mobile device may include software applications and associated handlers of either of the above types.

As shown in FIG. 11, the software application 238 generates XML data which is passed to the application handler 242. This data may have been previously stored on the mobile device 212, may be entered by a user on a keyboard, keypad or other input (not shown) on the mobile device 212, or may possibly be loaded onto the mobile device 212 through a data transfer system such as a serial port connection to a computer or a short-range wireless communication system such as an infrared receiver or Bluetooth™ communication module. XML data generated by the software application 238 may be transferred to the application handler 242 in a single transfer as shown in FIG. 11, or element by element as each element is generated.

When some or all of the XML data from the software application 238 is received by the application handler 242, the code book required to transcode the XML data into WBXML is requested from the code book system 244 using an identifier associated with the XML type of the data generated by the software application 238. The code book system 244 returns the requested code book to the application handler 242, by either retrieving the code book from its cache (not shown) or by requesting the code book from a data server if the code book is not available in its cache. The code book request process, possibly including generation of the code book at a data server, may be accomplished via any of the schemes described above.

When the code book is received by the application handler 242, the transcoding of the XML data into WBXML document elements continues. Once all of the XML data from the software application 238 has been transcoded into WBXML elements and transferred to the WBXML generator 241, the WBXML generator 241 assembles the WBXML elements into a WBXML document, including the identifier associated with the XML type, and transfers the WBXML document to the communication subsystem 236. The WBXML document is then transmitted to a data server.

The XML data generated by the software application 238 may also be stored in a memory (not shown) on the mobile device 212 until the requested code book is received. This provides for generation of data on a mobile device 212 even when the mobile device 212 is out of communication network coverage or is otherwise unable to request and/or receive a code book from a data server. Since the data is stored on the mobile device 212, other mobile device operations, functions and software applications may be used even though a generated XML document has not yet been transcoded and sent to the data server. The stored data can then be transcoded and sent to the data server whenever the code book is received.

It is contemplated that an XML document generated at the mobile device 212 may be destined for either a data server, an intended document recipient with which a data server may be configured to communicate, such as a web server for example, or both. If the XML document is to be transmitted to one or more recipients by a data server, then an address of each recipient is preferably appended to or embedded into the WBXML document by the software application 238, the application handler 242 or possibly the WBXML generator 241 in the mobile device 212.

The above example mobile device 212 and signal flows shown in FIG. 11 relate to generation of an XML document for which a code book is either available on the mobile device 212 or from a data server. As described above, a code book for an XML document having a publicly available grammar definition may be generated by any data server that has access to the grammar definition. As such, if mobile devices and mobile device software applications are configured to generate only known types of XML, then a mobile device need not include a code book generation system since any code books required to generate WBXML documents on a mobile device can then be requested from a data server. However, where processing resources on a mobile device permit, the mobile device may generate well-formed-only or other new types of XML documents, generate corresponding code books for such documents, and embed, prepend or append the code books to transcoded WBXML documents before sending the documents to a data server. Alternatively, and as described above for data server 18, a unique identifier could be generated and the code books could be stored in a code book cache (not shown) on the mobile device 212 if sufficient memory space is available. If a code book is required by a data server for a WBXML document generated from such an XML document, it could then be requested from the mobile device. Of these two alternatives, sending such code books to a data server may be preferable in order to avoid code book request management on a mobile device, possible time delays in retrieving code books from a mobile device when a mobile device is turned off or out of communication network coverage, and increased code book request/response traffic over mobile device to data server communication links.

Figure 12:
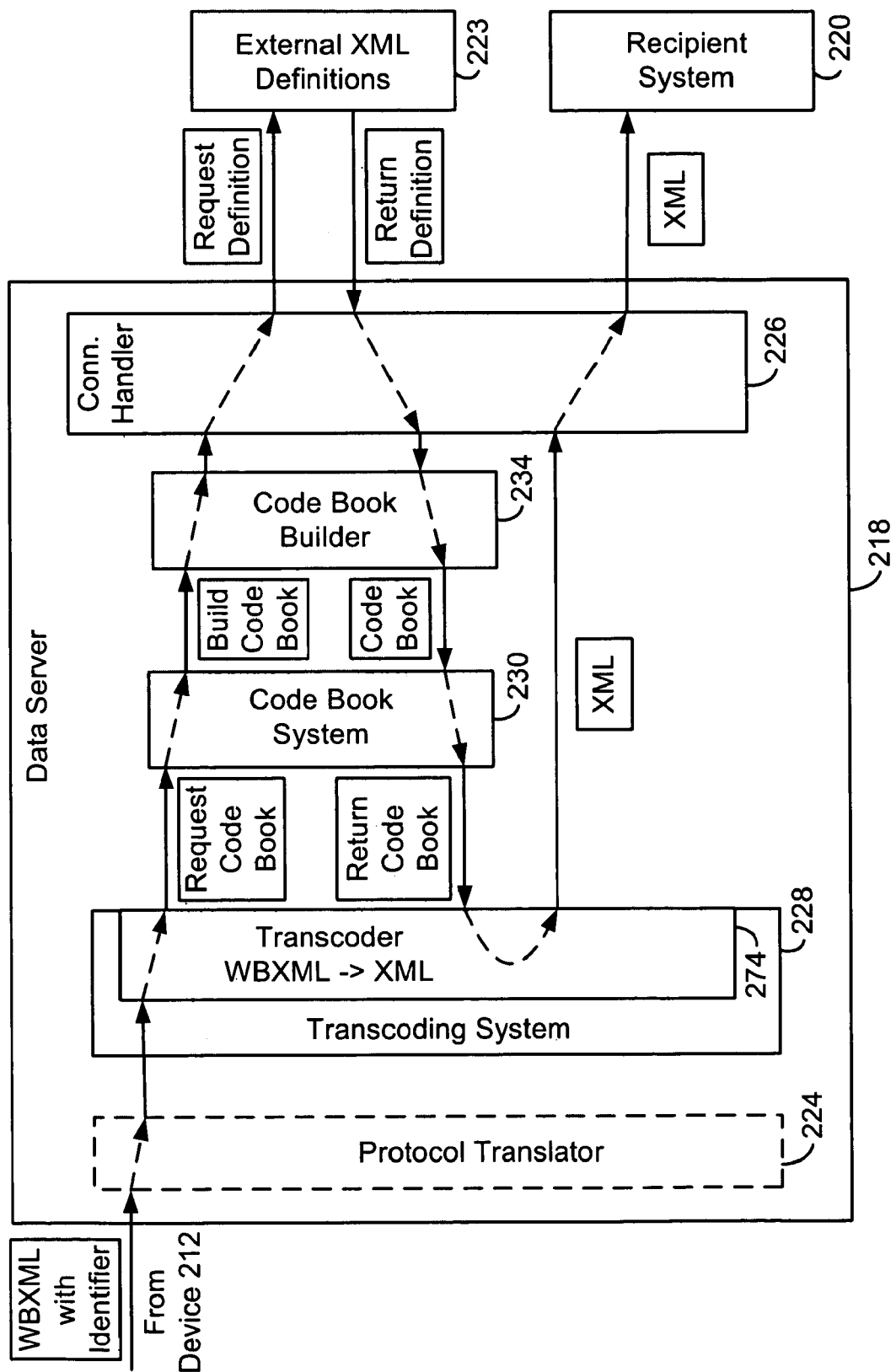
FIG. 12 is a signal flow diagram showing the processing of a WBXML document received from a mobile device by a data server.

FIG. 12 is a signal flow diagram showing the processing of a WBXML document received from a mobile device by a data server. The data server 218 and its components are substantially similar to the data server 18 and similarly labelled components shown in FIG. 3 and described above, except that the transcoder system 228 includes a WBXML→XML transcoder 274.

A mobile device 212 preferably transfers documents to a data server 218 using the same protocol used for document transfers from a data server to a mobile device, such as the proprietary IPPP, although different protocols may be used depending upon the direction of document transfer.

A WBXML document from the mobile device 212 is received by the data server 218 and any necessary protocol translations are performed by the protocol translator 224. The received WBXML document is forwarded to the transcoder 274 in the transcoding system 228. It should be apparent that the transcoder system 228 in the data server 218 also performs parsing of received documents. This is also true for the transcoding system 28 in the data server 18 described above. Those skilled in the art will appreciate that a separate parsing system could also be provided in a data server without departing from the scope of the present invention.

If the code book is embedded into or prepended or appended to the WBXML document, the transcoder 274 extracts and uses the code book to transcode the WBXML document elements into XML, and may also store the code book to a code book cache (not shown) in the code book system 230. In the example shown in FIG. 12, the received WBXML document has an external referenced definition. The identifier is used by the transcoder 274 to request the code book for the document from the code book system 230. The code book system either returns the requested code book, if the code book is found in its code book cache, or invokes the code book builder 234 to generate the requested code book.

As described above, the code book builder 234 requests the definition using the identifier, which is preferably an address such as a URL from which the definition may be retrieved, from an external definition source 223. When the definition is returned to the code book builder 234, it is used to generate the requested code book, which is then returned to the code book system 230. The code book system 230 preferably stores the new code book in its cache and provides the code book to the transcoder 274. The parsed WBXML elements are then transcoded and assembled into an XML document.

If the document from the mobile device 212 is intended to be further processed by the data server 218 or other components therein, then the XML document is forwarded to such other data server components or possibly stored to a memory (not shown) in the data server 218 for subsequent processing. If the received WBXML document is intended for a recipient system 220 identified by an address embedded into or provided with the document by the mobile device 212, then the transcoded document is forwarded to the recipient system 220 through an appropriate connection handler 226. Data server 218 to recipient system 220 communications may be accomplished through the connection handler 226 used for communications between the data server 218 and external definition source 223, as shown in FIG. 12, or different connection handlers may be used. Like a document request from the mobile device 12 as described above, the mobile device 218 may send a connection request with the WBXML document to specify any document recipient systems such as 220 and a communication handler and/or protocol to be used to transfer the document to any recipient systems.

XML documents generated at the mobile device 212 are thereby transcoded into WBXML for transfer to a data server 218 and transcoded back into XML by the data server 218. It is also contemplated that the mobile device 212 may transfer a WBXML document to a similarly enabled mobile device, either directly or through a data server. In the latter instance, a WBXML document is preferably forwarded to an intended recipient mobile device instead of being transcoded into XML by the data server. The recipient mobile device can request a required code book from either a data server or possibly from a sender mobile device.

Figure 13:
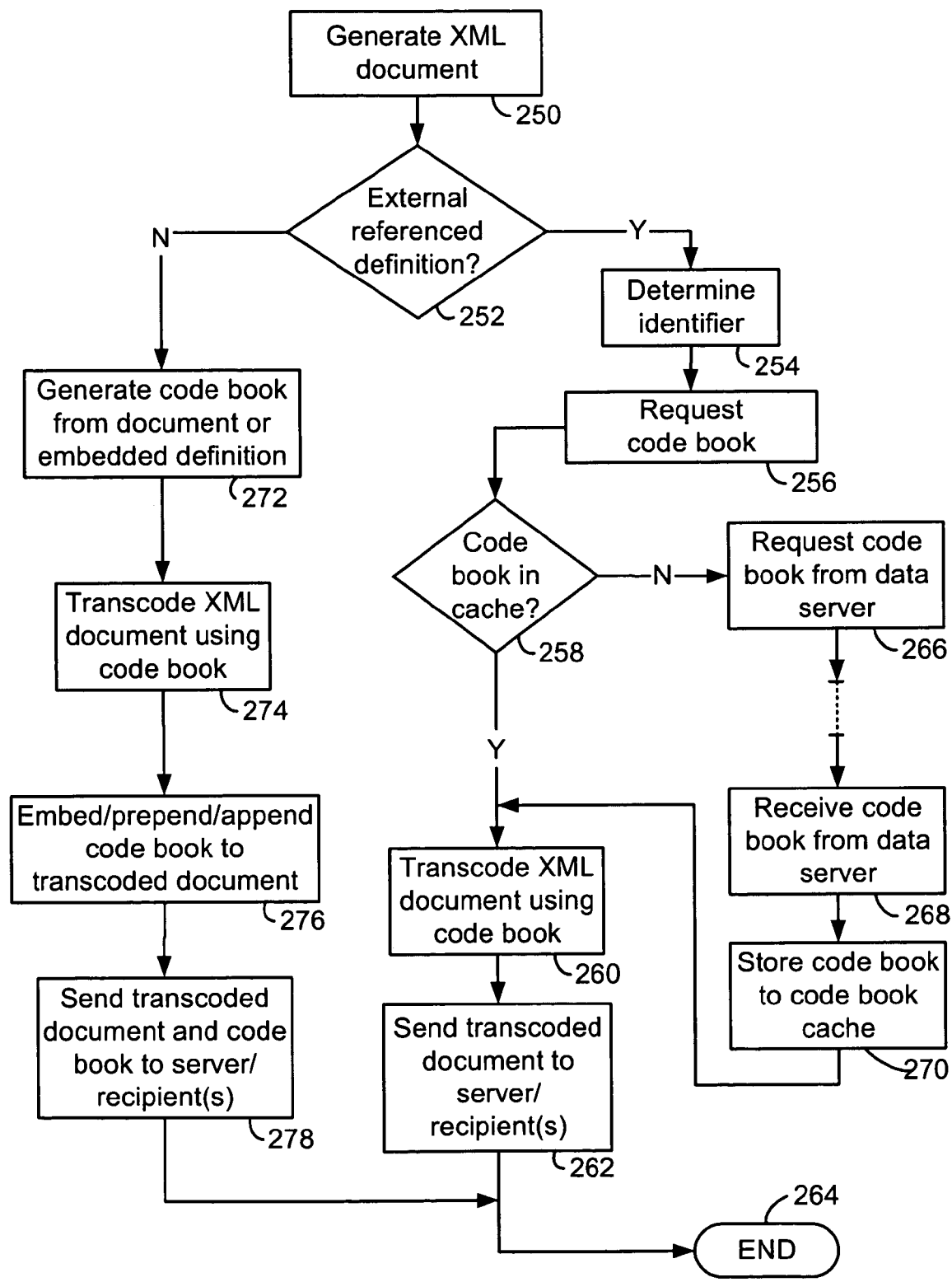
FIG. 13 is a flow chart representing mobile device processing of a generated XML document.
Figure 14:
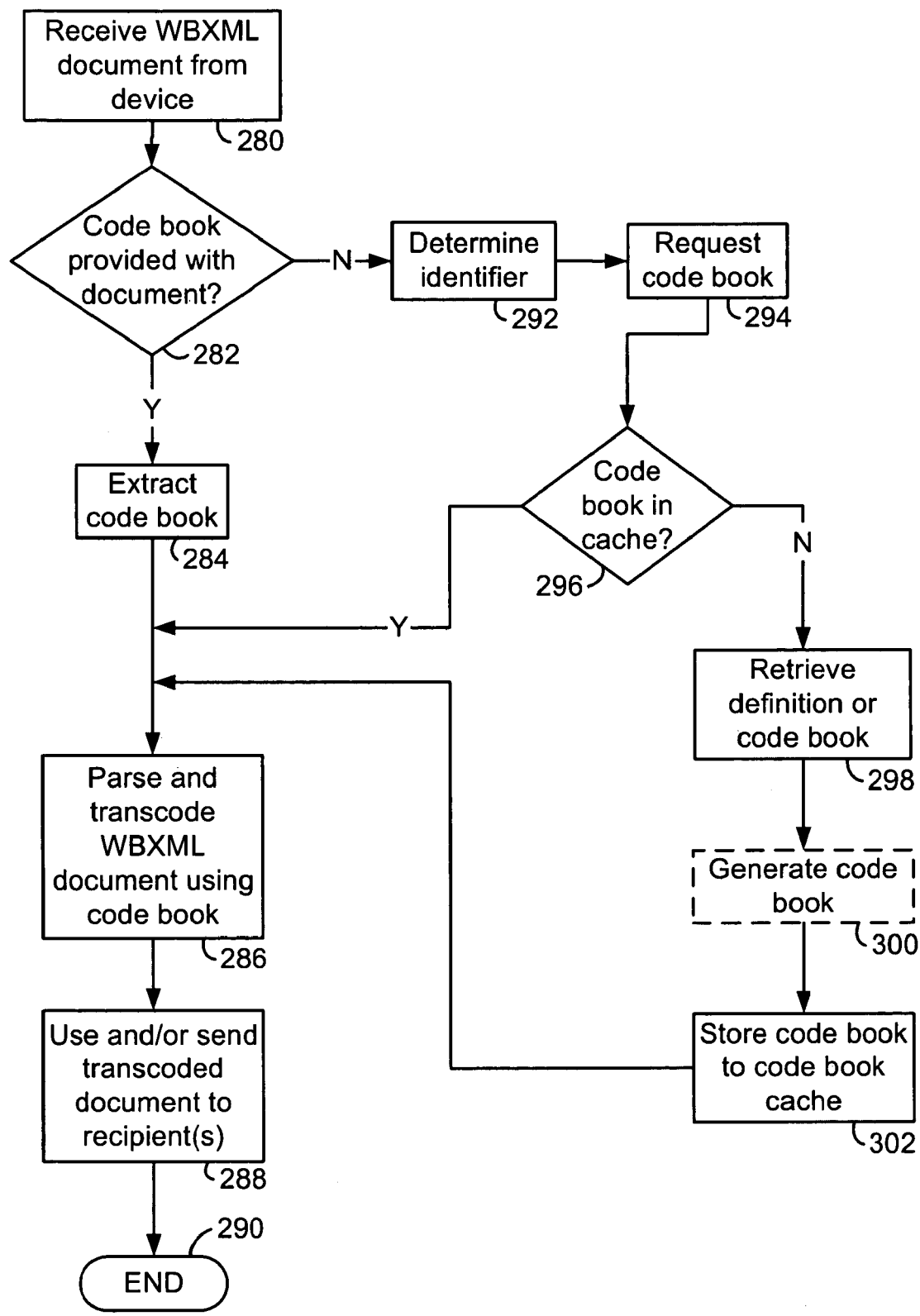
FIG. 14 is a flow chart illustrating the processing of a received WBXML document by a data server.

The content processing schemes shown in FIGS. 11 and 12 are shown in flow chart form in FIGS. 13 and 14. FIG. 13 is a flow chart representing mobile device processing of a generated XML document, and FIG. 14 is a flow chart illustrating the processing of a received WBXML document by a data server.

In FIG. 13, an XML document is generated at the mobile device 212 at step 250. It is then determined at step 252 if the XML document is a known XML document type having an external referenced and available grammar definition, such as a valid XML document. The type of XML document generated may be dependent, for example, upon the particular mobile device software application that generates the XML document. If the XML document has an external referenced definition such as a DTD, as may be determined by searching for a DOCTYPE statement in the XML document, then the document type identifier of the document is determined at step 254, and used in step 256 to request the corresponding code book from the code book system in the mobile device.

If the code book is stored in the code book cache of the mobile device code book system, as determined at step 258, then the XML document is transcoded at step 260 and the resultant WBXML document is sent to a data server and/or recipient(s) at step 262, completing mobile device processing of the generated XML document. The process ends at step 264. However, if the code book corresponding to the identifier is not in the code book cache (step 258), then it is requested from a data server at step 266. The code book is received from the data server at step 268, after some time delay indicated by the dashed line between steps 266 and 268. The code book is then preferably stored to the code book cache on the mobile device at step 270, and processing concludes with steps 260, 262 and 264 as described above.

Mobile devices with relatively limited processing power will likely be enabled to generate only XML documents for which code books can be generated by and requested from a data server in order to avoid code book generation on the mobile devices. In such mobile devices, processing of a locally generated XML document includes steps 250 and 254 through 270. When a mobile device can generate code books for XML documents such as new types of XML documents, well-formed-only documents that do not use a formal definition, or documents with embedded grammar definitions, then a negative determination may be made at step 252. The code book is generated from the document or embedded definition at step 272, as described above for example, the XML document is transcoded using the code book at step 274, the code book is preferably embedded into or prepended or appended to the transcoded WBXML document at step 276, and the WBXML document and code book are sent to the data server and/or recipient(s) at step 278.

Alternatively, the code book generated at step 272 may be stored to the code book cache on the mobile device using a calculated unique identifier. However, for the reasons discussed in detail above, code books generated from XML documents or embedded definitions are preferably sent to the data server or any other recipients with or within the WBXML document.

Turning now to FIG. 14, processing of a WBXML document generated at a mobile device will be described. FIG. 14 is a flow chart illustrating the processing of a received WBXML document by a data server. As shown, the processing method begins when a WBXML document from a mobile device is received at the data server at step 280. It is then determined whether the code book was provided with the document, for example where a code book used for a well-formed-only XML document was embedded into or prepended or appended to the WBXML document. If the code book was provided, it is then extracted at step 284, and the document is parsed and transcoded back into WBXML using the code book at step 286. As described above, the document sent from the mobile device may be intended for use by the data server and possibly also or instead by one or more recipients. The transcoded document is then distributed to components within the data server and/or to any intended recipients, at step 288. The method then ends at step 290. If the document is intended for one more recipient mobile devices, then the received WBXML document could be forwarded to the mobile devices at step 288 without being transcoded, whereas the transcoded XML version could be sent to other recipients such as computer systems with which the data server can communicate, through a WAN such as the Internet, for example. Since WBXML can also provide for more efficient use of communications resources even for wired communication systems, it is possible that a data server may be configured to distribute a received WBXML document to all recipients, and that the transcoding operations of step 286 would be performed by each recipient.

If the code book was not provided by the mobile device with the received WBXML document, as determined at step 282, then the data server determines the identifier of the received document at step 292. The code book is then requested from the code book system in the data server, using the identifier, at step 294. The code book system then determines whether the code book is in its cache at step 296. If the code book is found in the cache, then processing proceeds at step 286, as described above. If the code book is not in the cache, then at step 298, either the definition associated with the identifier or the code book itself is retrieved. In most implementations, it is contemplated that the definition will be retrieved and the code book will be generated by the data server. However, it should be understood that the invention is in no way limited thereto. Where mobile device resources permit, code books could be requested from a mobile device from which the WBXML document was received.

When a definition is retrieved by the data server at step 298, a code book is generated at step 300. The required code book, whether generated at step 300 or retrieved at step 298 by the data server, is preferably stored to the data server code book at step 302, and processing concludes with steps 286, 288 and 290 as described above.

In accordance with a further aspect of the invention, WBXML documents may be exchanged directly between mobile devices. Mobile device processing of a received WBXML document may be substantially as described above. A required code book that is not provided with the WBXML document or found in the mobile device's code book cache can preferably be requested from either a data server or possibly the sending mobile device.

Figure 15:
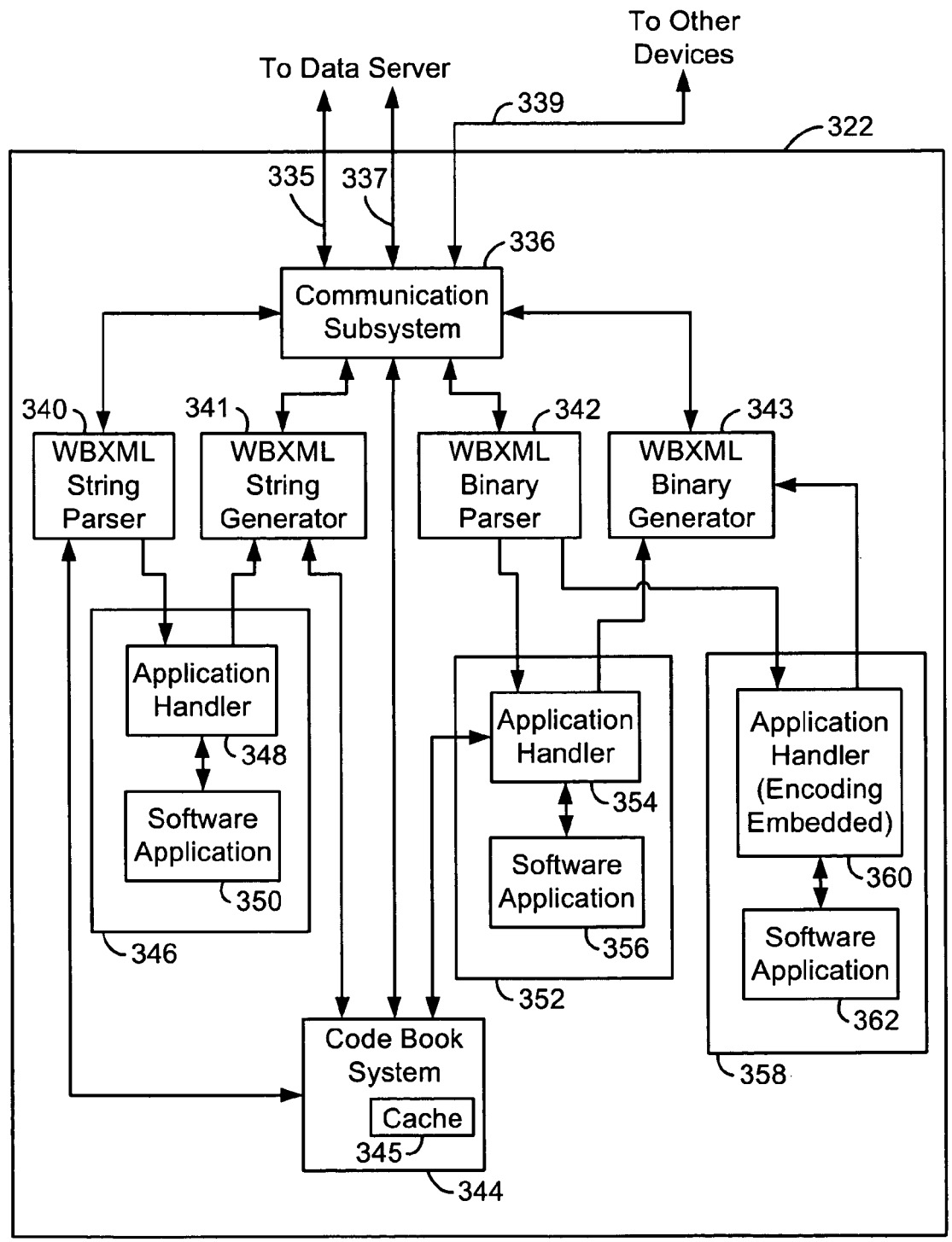
FIG. 15 is a block diagram illustrating a mobile device in which systems and methods according to the invention could be implemented.

FIG. 15 is a block diagram illustrating a mobile communication mobile device in which systems and methods according to the invention could be implemented. In FIG. 15, the mobile device 322 includes a communication subsystem 336, a WBXML string parser 340, a WBXML string generator 341, a WBXML binary parser 342, a WBXML binary generator 343, three software applications 346, 352 and 358, each including software code implementing the actual software application 350, 356, 362 and a corresponding application handler 348, 354, 360, and a code book system 344 including a code book cache 345. The mobile device 322 in FIG. 15 is substantially similar to the mobile device 12 in FIG. 2, but shows multiple software applications and two types of WBXML parsers and generators.

The communication subsystem 336 includes such components as required for the mobile device 322 to communicate with a data server over the links 335 and 337, which may be used for document transfers and code book requests and responses, for example, and possibly with other mobile devices over the link 339. The exact implementation of the communication subsystem 336 will depend upon the communication systems and protocols with which the mobile device 322 is intended to operate, as described above.

The WBXML string parser 340 receives WBXML documents and both parses and transcodes the documents back into XML. The string parser 340 is therefore connected to the code book system 344 to provide for code book retrieval when a WBXML document is received. If the code book is embedded into or prepended or appended to the received document however, the code book is extracted, passed to the code book system 344 for storage in the code book cache 345, and used to transcode the WBXML document. Parsed and transcoded XML data is then passed to the application handler 348 for use by the application 350. It should be appreciated that the application 346 is configured to work with XML on the mobile device 322 and is therefore passed XML data by the string parser 340. Similarly, the application 346 is also configured to generate XML on the mobile device 322. XML data generated by the software application 350 is passed to the WBXML string generator 341 by the application handler 348. The WBXML string generator 341 either retrieves the relevant code book from the code book system 344 or generates the code book from the XML data or an embedded definition as described above. The code book is used to transcode the XML data into WBXML data which is assembled into a WBXML document and passed to the communication subsystem 336 for transmission to a data server or possibly another mobile device. A code book generated on the mobile device 322 may be sent along with the transcoded WBXML document, stored in the cache 345 in the code book system 344, or both.

The software application 352, configured to work with the binary parser 342, includes an application handler 354 which handles transcoding operations. A received WBXML document to be used by the application 352 is parsed by the parser 342 and parsed WBXML document elements are passed to the application handler 354. The application handler 354 then either requests the code book from the code book system 344 or extracts an embedded code book from the document, and uses the code book to transcode the parsed elements into WBXML. When an XML document is generated using the software application 356, the application handler 354 either generates the appropriate code book from the document itself or an embedded definition or requests the code book from the code book system 344, and uses the code book to transcode XML elements generated by the application 356 into WBXML binary elements. The WBXML binary generator 343 performs reverse operations of the WBXML binary parser 342, and assembles WBXML elements passed to it by the application handler 354 into WBXML documents.

The applications 346 and 352 are configured to operate in conjunction with the code book system 344 in accordance with aspects of the invention. It should also be appreciated that a mobile device 322 incorporating such applications may also have other software applications installed and operating thereon. For example, application 358 includes an application handler 360 in which an encoding scheme is embedded, as would be common according to a known technique described above. The application 358 may use the parser 342 and generator 343, as shown in FIG. 15, but does not interact with the code book system 344. Implementation of the invention in a mobile device may thereby provide for backwards compatibility with mobile device software applications that use embedded transcoding schemes.

The mobile device 322 as shown in FIG. 15 is intended for illustrative purposes only, and the invention is in no way restricted to a mobile device including the components shown therein. For example, further software applications which only send or receive XML, as well as still other applications enabling communication functions or non-communication functions, may also or instead be implemented on a mobile device.

It will be appreciated that the above description relates to preferred embodiments by way of example only. Many variations on the invention will be obvious to those knowledgeable in the field, and such obvious variations are within the scope of the invention as described herein, whether or not expressly described.

For example, although a single mobile device, data server and information source are shown in the drawings, a data server will typically provide services for a plurality of mobile devices, possibly via different wireless communication networks, and access to a plurality of information sources through different direct or network-based connections. Similarly, any wireless communication network and any information source may communicate with multiple data servers.

In addition, the systems and methods described above may be implemented for transcoding and parsing of content types other than XML. Similarly, these systems and methods could be adapted for other encoding schemes than WBXML. The benefits and advantages described above could also be derived for such encoding schemes as type length encoding, for example.

Although data servers and information sources are described above primarily as separate systems, an integrated system incorporating both data server and information source functionality is also contemplated. Such integrated systems are particularly advantageous when confidential or otherwise sensitive information is provided by an information source. In this case, no intermediate data server is required to transcode information for transmission to a mobile device. For example, confidential information that is transcoded and encrypted at the information source remains encrypted until decrypted at the mobile device, providing end-to-end security.

We claim:

1. A system of processing extensible markup language (XML) documents, comprising:
   a code book system configured to receive code book requests and to provide a code book responsive to each code book request;
   a memory in the code book system configured to store code books;
   a transcoder system configured to receive XML documents, and, for each received XML document, to request a corresponding code book from the code book system and to use the code book to transcode the received XML document; and
   a code book builder configured to generate code books,
   wherein the code book system is further configured to determine whether a requested code book is stored in the memory, and to initiate the code book builder to build the requested code book and to receive the requested code book from the code book builder where the requested code book is not stored in the memory.

2. The system of claim 1, further comprising a connection handler configured to receive documents from an information source and to provide the documents to the transcoder system.

3. The system of claim 2, wherein the connection handler is further configured to receive transcoded documents from the transcoder system, and to send the transcoded documents to a wireless mobile communication device via a wireless transport.

4. The system of claim 3, wherein the connection handler is further configured to receive connection requests from the wireless mobile communication device via the wireless transport, and wherein the documents are requested from the information source responsive to the connection requests.

5. The system of claim 4, further comprising a protocol translator configured to convert the connection requests from a first protocol associated with the wireless transport to a second protocol associated with the connection handler and the information source.

6. The system of claim 1, further comprising a code book servlet which receives code book requests for code books from a wireless mobile communication device via a wireless transport, requests the code book from the code book system, and returns the requested code books to the wireless mobile communication device via the wireless transport.

7. The system of claim 1, wherein the code book builder is further configured to retrieve a document definition for a received document and to generate a code book based on the document definition when the code book system initiates the code book builder.

8. The system of claim 7, wherein the code book system is further configured to determine a document identifier associated with the document definition of a received document and to provide the document identifier to the code book builder where the requested code book is not stored in the memory.

9. The system of claim 8, wherein the document identifier is a resource address from which the document definition is available.

10. The system of claim 7, wherein the document definition is embedded in the received document and extracted from the received document.

11. The system of claim 1, wherein the code book system is further configured to store code books generated by the code book builder to the memory.

12. A system of providing a extensible markup language (XML) code book in response to a XML code book request, comprising:
    a receiver configured to receive a code book request from a requestor, the code book request identifying a requested code book;
    a XML code book cache storing a plurality of code books;
    a XML code book system configured to determine whether the requested code book is stored in the code book cache;
    a XML code book builder configured to generate the requested code book and to store the requested code book in the code book cache where the requested code book is not stored in the code book cache; and
    a transmitter configured to transmit the requested code book to the requestor.

13. The system of claim 12, wherein the code book request comprises a document type identifier to identify the requested code book, and wherein the code book builder is further configured to retrieve a document definition corresponding to the document type identifier and to generate the requested code book using the document definition.

14. The system of claim 13, further comprising a connection handler for receiving a document definition request from the code book builder, retrieving the document definition from a document definition source, and returning the document definition to the code book builder.

15. The system of claim 14, wherein the document definition source is a document type definition (DTD) server.

16. The system of claim 12, wherein the receiver and the transmitter comprise a code book servlet.

17. The system of claim 12, implemented in a data server.

18. The system of claim 12, implemented in a wireless mobile communication device.

* * * * *